US008951125B2

(12) United States Patent
Byng

(10) Patent No.: US 8,951,125 B2
(45) **Date of Patent: *Feb. 10, 2015**

(54) SYSTEM INCLUDING ONE OR MORE GAMING MACHINES

(75) Inventor: Stephen Byng, Cherrybrook (AU)

(73) Assignee: Aristocrat Technologies Australia Pty Ltd (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,208

(22) Filed: Aug. 23, 2012

(65) Prior Publication Data

US 2013/0084993 A1 Apr. 4, 2013

Related U.S. Application Data

(63) Continuation of application No. 12/067,579, filed as application No. PCT/AU2006/001394 on Sep. 22, 2006, now Pat. No. 8,272,960.

(30) Foreign Application Priority Data

Sep. 23, 2005 (AU) ................................ 2005905260

(51) Int. Cl.
*G07F 17/32* (2006.01)
*A63F 13/12* (2006.01)

(52) U.S. Cl.
CPC .......... *G07F 17/3223* (2013.01); *G07F 17/323* (2013.01)
USPC ............................................... 463/42; 463/27

(58) Field of Classification Search
CPC ..... A63F 13/12; G07F 17/32; G07F 17/3258; G07F 17/323
USPC ...................................................... 463/42, 27
See application file for complete search history.

(56) References Cited

U.S. PATENT DOCUMENTS

| | | | | |
|---|---|---|---|---|
| 6,997,803 | B2 | 2/2006 | LeMay et al. | |
| 7,607,976 | B2 * | 10/2009 | Baerlocher et al. | 463/16 |
| 2003/0176213 | A1 | 9/2003 | LeMay et al. | |
| 2004/0185936 | A1 | 9/2004 | Block et al. | |
| 2008/0139274 | A1 * | 6/2008 | Baerlocher | 463/16 |
| 2008/0153564 | A1 * | 6/2008 | Baerlocher et al. | 463/16 |
| 2008/0254883 | A1 | 10/2008 | Patel et al. | |
| 2008/0254893 | A1 * | 10/2008 | Patel et al. | 463/42 |
| 2010/0291991 | A1 * | 11/2010 | Baerlocher et al. | 463/20 |

FOREIGN PATENT DOCUMENTS

| | | | |
|---|---|---|---|
| WO | 0199067 | A2 | 12/2001 |
| WO | 2005038555 | A2 | 4/2005 |
| WO | 2006002084 | A1 | 1/2006 |

* cited by examiner

*Primary Examiner* — Pierre E Elisca
(74) *Attorney, Agent, or Firm* — McAndrews, Held & Malloy, Ltd.

(57) ABSTRACT

There is disclosed a system including one or more gaming machines and one or more system control resources. The system control resources are configured to dynamically control the provision of services to components of the system. Each of the services is implemented by way of one or more software processes running on one or more data processing resources of the gaming system. At least one system control resource is further configured to dynamically allocate said software processes amongst the data processing resources of the gaming system. The services can include a service that determines an outcome of one or more games playable on a gaming machine, and at a service configured to trigger the award of a jackpot prize.

9 Claims, 13 Drawing Sheets

SYSTEM INCLUDING ONE OR MORE GAMING MACHINES

FIELD OF THE INVENTION

The present invention generally relates to gaming apparatus and methods of gaming. A particular embodiment of the present invention relates to a system including one or more gaming machines and one or more system control resources. Preferably, the system control resources are configured to dynamically control the provision of services to components of the system.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player can start to quickly play the game and therefore extract maximum entertainment from the game.

Known gaming systems which include linked progressive jackpots typically fall within two categories. A first category includes systems in which the award of jackpots are triggered by a stand alone jackpot controller. In such systems the jackpot controller is also configured to maintain jackpot prize values and increment them in accordance with contribution data transmitted to it from linked gaming machines. In such systems the jackpot controller may also be configured to reseed the jackpot upon the jackpot being won.

In systems of a second type, the jackpot controller is configured to manage jackpot values by incrementing or decrementing the jackpots as necessary and awarding payouts in the event that a jackpot is won, but the jackpot controller may take no part in triggering the award of a jackpot. In such systems the award of a jackpot is triggered by a gaming machine, typically in response to a predetermined game outcome being achieved. Alternatively, the jackpot may be randomly triggered by a gaming machine independently of a game outcome.

In both of the above systems, game outcomes are determined by game controllers with the awards, in particular for basic games, being based on internal paytables.

In both types of system the connections between the jackpot controller and gaming machines are fixed and communication between them is limited to set of interactions defined by predetermined command protocols. The type of control that a gaming machine has over the award of a jackpot, and the nature of the interaction between a gaming machine and jackpot controller, is therefore predefined, and the design of a game and jackpot controller must be restricted to the predefined relationship.

These fixed forms of interoperation between jackpot controllers and gaming machines constrain game designers in their ability to design new games for players, as the fixed jackpot triggering and control mechanisms must be adhered to.

In addition to constraining game design these systems do not offer optimal jackpot or game performance. For example, since game data is not directly available to the jackpot controller delays in transmission of signals between a gaming machine and the jackpot controller, and delays in responses thereto, may be experienced. This can result in players becoming frustrated with the system or even being unaware of a jackpot that they have won if details of the jackpots are not communicated in a timely manner. In some instances, the actions of a jackpot and a gaming machine may be asynchronous with respect to one another. For instance, a display relating to a jackpot that has been won may appear while a player is playing a game subsequent to that in which the jackpot was won.

Any reference in this specification to the prior art does not constitute an admission that such prior art was well known or forms part of the common general knowledge in any jurisdiction

SUMMARY OF THE INVENTION

In a first aspect there is provided a gaming system including at least one gaming machine in data communication with at least one system control resource configured to control the provision of one or more services to components of the gaming system, each of said services being implemented by way of one or more software processes running on one or more data processing resources of the gaming system; wherein the at least one system control resource is further configured to dynamically allocate said software processes amongst the data processing resources of the gaming system.

In a particularly preferred embodiment said plurality of services includes at least one service configured to determine an outcome of one or more games playable on said at least one gaming machine, and at least one service configured to trigger the award of a jackpot prize.

Preferably the system is configured to allow intra-service interactions between two or more software processes of a service, and/or inter-service interactions between software processes of two or more services, to be dynamically configured by either a service or a software process.

Preferably the system is configured to allow one or more intra-service interaction triggering parameters or inter-service interaction triggering parameters to be dynamically configured by either a service or a software process.

In a preferred embodiment the data processing resources of the gaming system includes at least one server and one or more data processing resources located remotely from the at least one server. In this case, the system control resource can be configured to move a process running on a server to one of the remotely located data processing resources.

Preferably said system control resource is implemented by one or more system processes running on a server system.

Accordingly, in a second aspect the present invention provides a server system including at least one data storage component for storing a set of instructions thereon and one or more data processing resources configured to operate under the control of the set of instructions to determine an outcome of one or more games and to determine the award of a jackpot prize.

Preferably a data processing resource of the server system is configured to run at least one jackpot process to control the operation of at least one jackpot.

Preferably, the award of said jackpot prize is determined by one or more interactions between a jackpot process and at least one second process running on at least one data processing resource of the server system.

In a preferred embodiment an interaction between a jackpot process and at least one second process is dynamically definable. The interaction may be dynamically definable by a process running on the at least one data processing resource of the server system or a remote data processing resource of a gaming system linked to the server system.

The at least one second process can be selected from the following types of processes:

a game process, configured to determine the outcome of a game;

a system process, configured to control the operation of at least part of a gaming system of which the server system is a part;

a player process, representative of a particular player participating in a game controlled by the server system;

a terminal process, representative of the operation at least an aspect of a gaming machine that is apart of a gaming system of which the server system is a part.

Interactions between a jackpot process and at least one second process can be, but are not limited, to the interactions listed in Table 2.

An interaction between a jackpot process and at least one second process running on at least one data processing resource of the server system is preferably triggered in the event that one or more trigger criteria are met. Said one or more trigger criterion can be met by any one or more of a jackpot process running on the server system, or one or more second processes. The trigger criteria can be selected from, but are not limited to, the criteria listed in Table 1.

In an embodiment, the data processing resources of the server system can include at least one central processing resource. The data processing resources may also include one or more remote data processing resources. In a particularly preferred embodiment the remote data processing resources forming part of the server system are dynamically definable by a process running on the server system.

Preferably the server system is configured to dynamically allocate a data processing resource of the server system for running a particular process.

According to a third aspect of the present invention there is provided a gaming system including:

a server system configured to determine an outcome of one or more games playable on a gaming machine and to trigger the award of said jackpot prize;

at least one gaming machine in data communication with the server system, said gaming machine being configured to enable a game, that has its outcome determined by the server system, to be played thereon.

Preferably the server system is implemented in accordance with an embodiment of the second aspect of the invention.

In one embodiment a data processing resource of a gaming machine may also be selectively used as a remote data processing resource of the server system. In a particularly preferred embodiment, the use of a data processing resource of a gaming machine as a remote data processing resource of the server system is initiated by a process running on the server system.

Preferably the server system is configured to dynamically allocate a data processing resource of the server system for running a particular process. The server system can be configured to move a process running on one data processing resource to another data processing resource.

In a further aspect, the present invention also provides a data storage device storing thereon a set of instructions configured to control the operation of a processing means of a server system to determine an outcome of one or more games playable on a gaming machine and to trigger the award of said jackpot prize. Preferably the server system is caused to operate in accordance with an embodiment of the second aspect of the present invention.

In a further aspect there is provided a method of operating a gaming system including an server system and one or more gaming machine, said method including:

determining an outcome of one or more games on the an server system; and determining the award of a jackpot prize on the same server system.

Preferably the method includes: running at least one jackpot process to control the award of a jackpot prize.

Preferably the method includes: running at least one game process to control the outcome of one or more games.

The method can include awarding a jackpot prize on the basis of one or more predetermined interactions between a jackpot process and at least one second process. Preferably the method includes enabling interactions between a jackpot process and at least one second process to be dynamically defined whilst the jackpot process and/or at least one second process is performed.

In yet another aspect the present invention provides a method of operating a gaming system including at least one gaming machine, said method including:

providing a plurality of services to said at least one gaming machine, said services being implemented by way of one or more software processes; and enabling inter-process interactions between at least two of said processes to enable interaction between at least two of said services.

The method can include, dynamically defining inter-process interactions to change the interaction between two services.

The method can further include dynamically defining interaction triggering conditions to change the circumstances in which interaction between two services can occur.

Preferably the services include one or more game services and/or one or more jackpot services.

The inter-process interactions can include the interactions listed in Table 2 below.

In the present specification the phrase "software process" should be understood to include, data processing threads or data processing that takes place via the use of a virtual machine and other software configured data processing means. The term "service" should be understood to be any software implemented function, the provision of software applications or instructions and/or data needed to implement a function, or outcome of such a function that is provided to a component of the gaming system by a processing resource of a the gaming system.

BRIEF DESCRIPTION OF THE DRAWINGS

Embodiments of the present invention will now be described by way of non-limiting example only with reference to the accompanying drawings, in which.

DETAILED DESCRIPTION OF THE EMBODIMENTS

Figure 1:
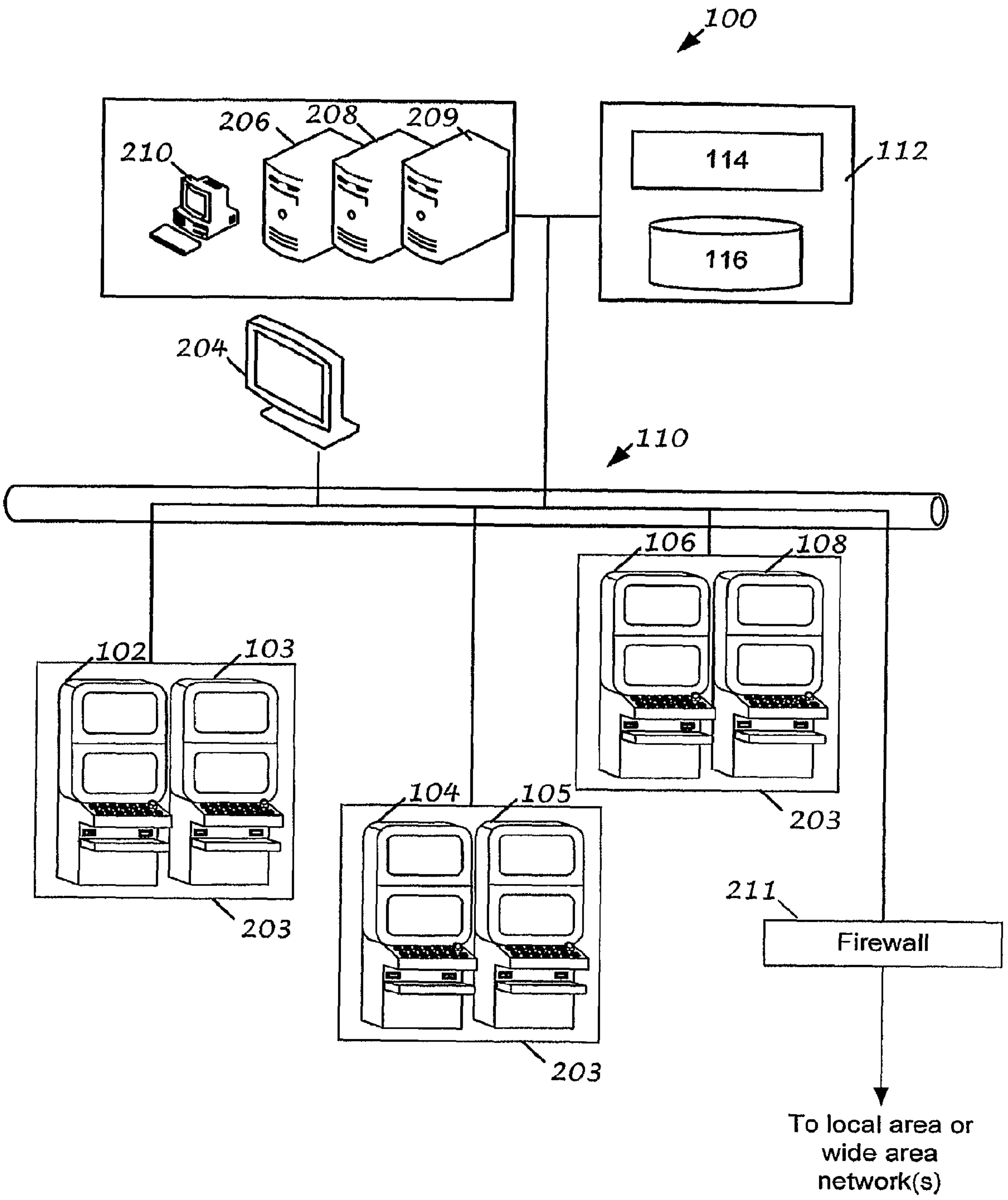
FIG. 1 depicts a schematic diagram of a gaming system operating in accordance with an embodiment of the present invention.
Figure 2:
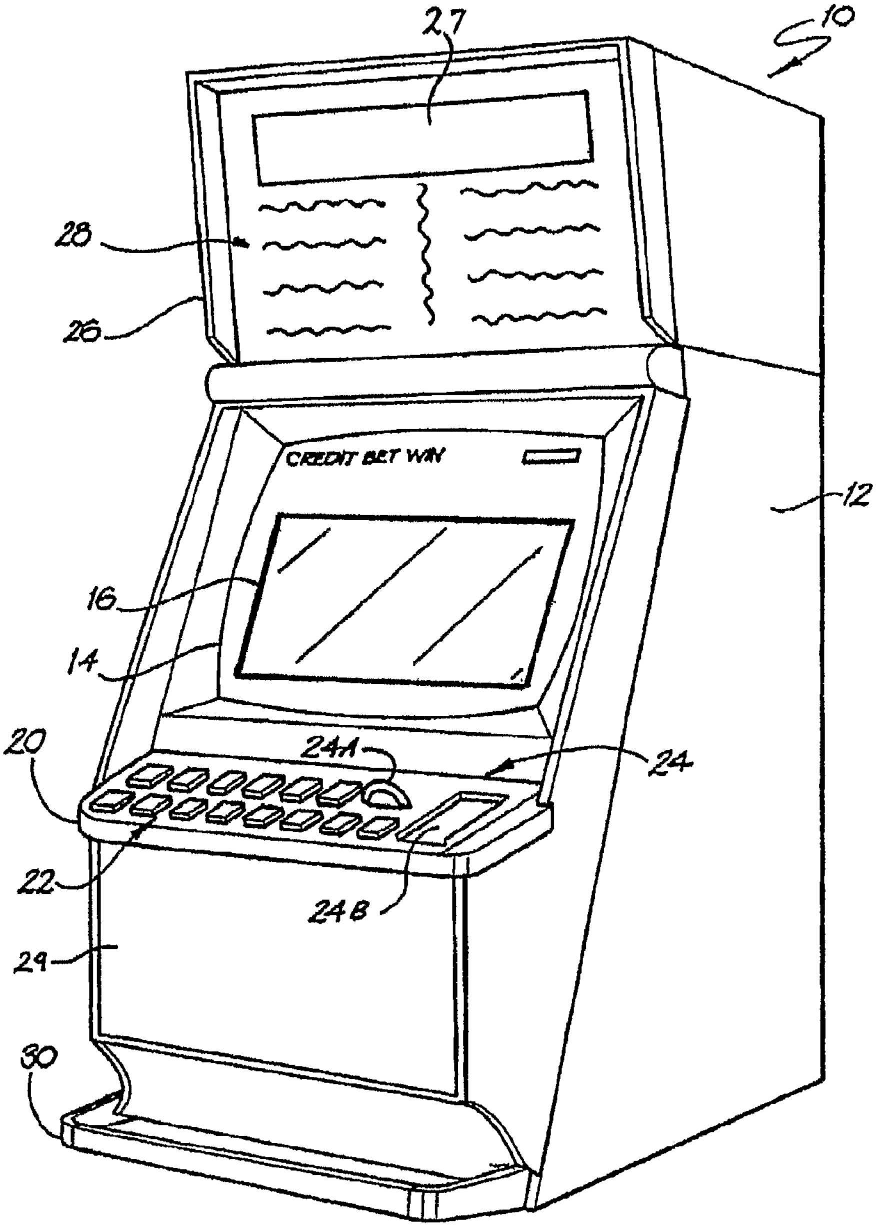
FIG. 2 depicts a gaming machine of the type used in the system of FIG. 1.

FIG. 1 shows a gaming system 100. The gaming system 100 includes a network 110, which for example may be an Ethernet network. Gaming devices (102, 103 . . . 108), shown arranged in three banks 203 of two gaming devices in FIG. 1, are connected to the network 110. The gaming devices (102, 103 . . . 108) may be gaming machines 10, as shown in FIG. 2 or form part or all of another gaming apparatus 100 (such as that depicted in FIG. 3). Single gaming devices (102, 103 . . . 108) and banks 203 containing three or more gaming devices may also be connected to the network 110.

One or more displays 204 may also be connected to the network 110. The displays 204 may, for example, be associated with a bank 203 of gaming devices. The displays 204 may be used to display representations associated with game play on the gaming devices (102, 103 . . . 108), and/or used to display other representations, for example promotional or informational material.

A server system 112 that acts as a system control resource of the system is connected to the network 110. The server system 112 includes at least one data processing resource 114 and data storage means 116. The data storage means is configured to store an instruction set configured to be run on the data processing resource 114 to control the operation of the server system 112. The data storage means 116 also stores thereon relevant system parameters and other data necessary to operate the gaming system. The data processing resource 114 operating under the instruction set is configured to cause the server system 112 to provide services to the game machines to, inter alia, determine the outcome of the various games played on each of the gaming machines 102 to 108 and to control the operation of a jackpot winnable by players of one or more of the gaming machines 102 to 108.

The server system 112 may include a plurality of physical servers for performing dedicated tasks, for example, it may include a database management server 206 for managing the storage of game programs and associated data for downloading or access by the gaming devices (102, 103 . . . 108) in a database 206A, a gaming floor management server 208, and a licensing server 209 to monitor the use of licenses to particular games. An administrator terminal 210 can provided to allow an administrator to run the network 110 and the devices connected to the network.

The gaming system 100 may communicate with other gaming systems, other local networks, for example a corporate network and/or a wide area network such as the Internet through a firewall 211.

Figure 3A:
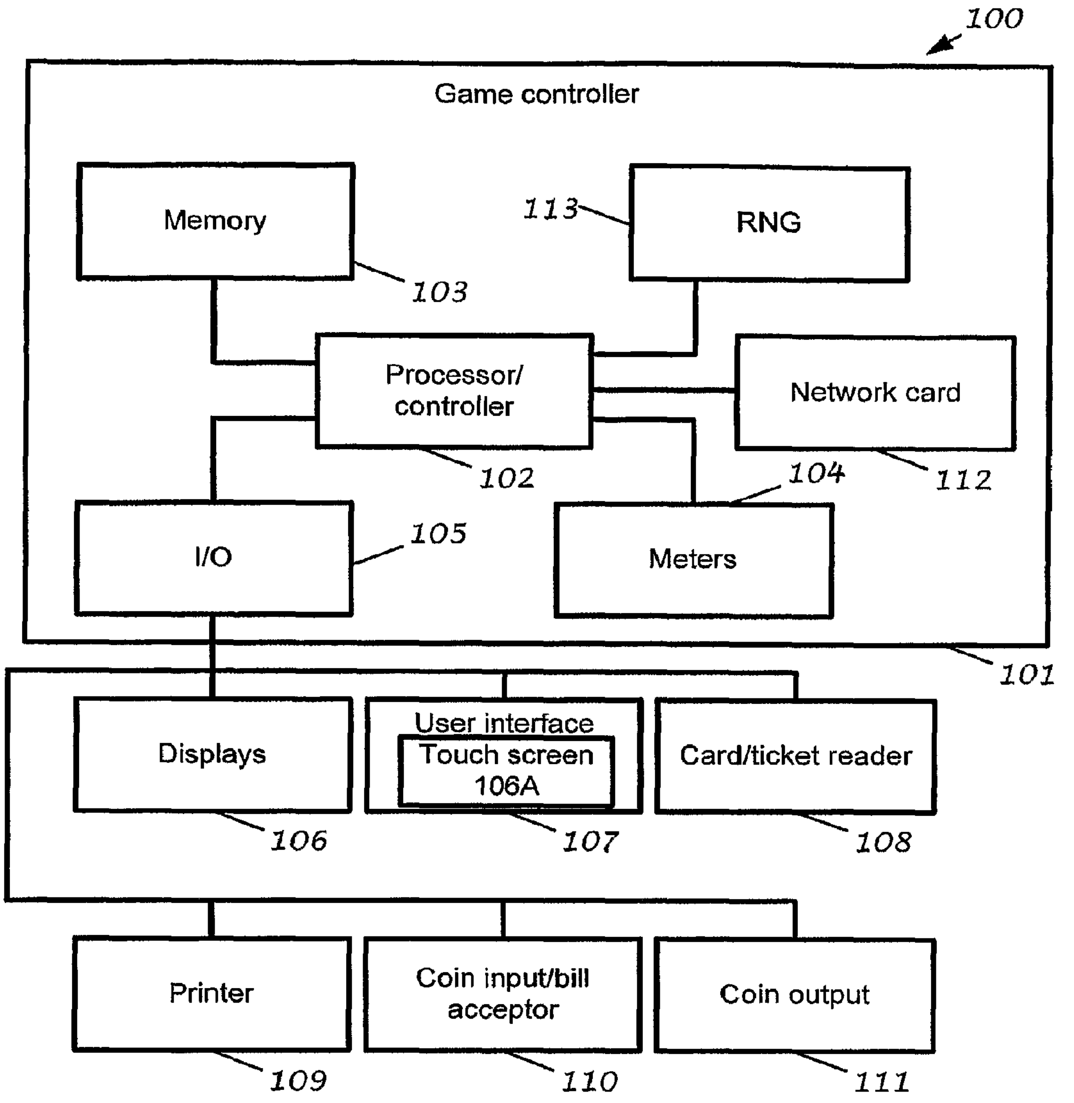
FIG. 3A shows a block diagram of gaming apparatus suitable for implementing the present invention.
Figure 3B:
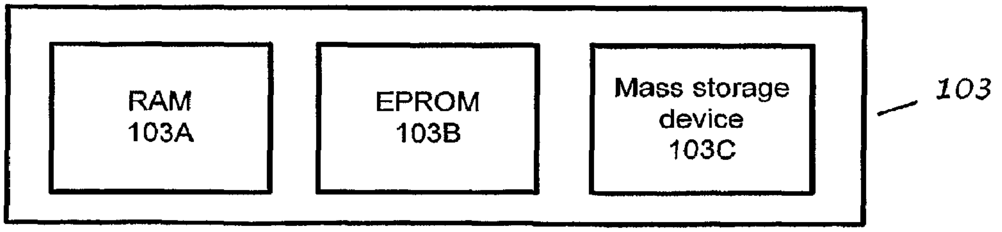
FIG. 3B shows a block diagram of components of the memory of the gaming apparatus represented in FIG. 3A.

FIGS. 2 to 3B depict further detail of a gaming machine such as gaming machines 102 to 108 (of FIG. 1) and control circuitry implemented in such a gaming machine, respectively. In FIG. 2, reference numeral 10 generally designates a gaming machine configured to enable a player to play a game. The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10. The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also carry a display, such as an auxiliary jackpot display 27 which can display the jackpot status of the machine as well as other jackpot-related information, such as the value of a jackpot able to be won by a player etc. The display 27 may be of the same type as the display 14, or a different type of display.

FIG. 3A shows a block diagram of a gaming apparatus, generally referenced by arrow 100, suitable for implementing the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may also have distributed hardware and software components that communicate with each other directly or through a network. Accordingly, different reference numerals have been used in FIG. 3A from FIG. 2 for components that may be equivalent.

The gaming apparatus 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with the computational device 102. Typically, the gaming apparatus 100 will include both volatile and non-volatile memory and more than one of each type of memory, with such memories being collectively represented by the memory 103. The instructions to cause the game controller 101 to implement the present invention will be stored in the memory 103.

The gaming apparatus may include hardware meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 3A, the peripheral devices that communicate with the controller are one or more displays 106, user input devices 107, a card and/or ticket reader 108, a printer 109, a bill acceptor and/or coin input mechanism 110 and a coin output mechanism 111. One or more of the displays 106 may include a touch screen 106A, forming part of the user input devices 107. Additional devices may be included as part of the gaming machine 100, or devices omitted as required for the specific implementation.

In addition, the gaming machine 100 may include a communications interface, for example a network card 112. The network card, may for example, send status information, accounting information or other information to a central controller, server or database and receive data or commands from a the central controller, server or database. One or more of the peripheral devices, for example the card/ticket reader 108 may be able to communicate directly with the network card 112.

The game controller 101 may also include a random number generator 113, which generates a series of random numbers that determine the outcome of a series of random game events played as part of a game on the gaming apparatus 100. The computational device 102 may include two or more controllers or processors, which may be local or remote from each other and the displays 106.

FIG. 3B shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

Referring again to FIG. 1, in the present embodiment the server system 112 provides, inter alia, the dual services of determining the outcome of games played on the gaming machines 102 to 108 as well as controlling the award and distribution of jackpots. In order to more clearly illustrate an aspect of the present invention, it is useful to consider "game processes" as distinct from "jackpot processes". It will be appreciated, from the names given to these two classes of process, game processes refer to those steps implemented within the system that are involved in the control of the playing of a game including any bonus game features playable on the gaming machines 102 to 108, and jackpot processes are those processes run on the server system 112 which are involved in the controlling an award of a one or more jackpot prizes.

Figure 4:
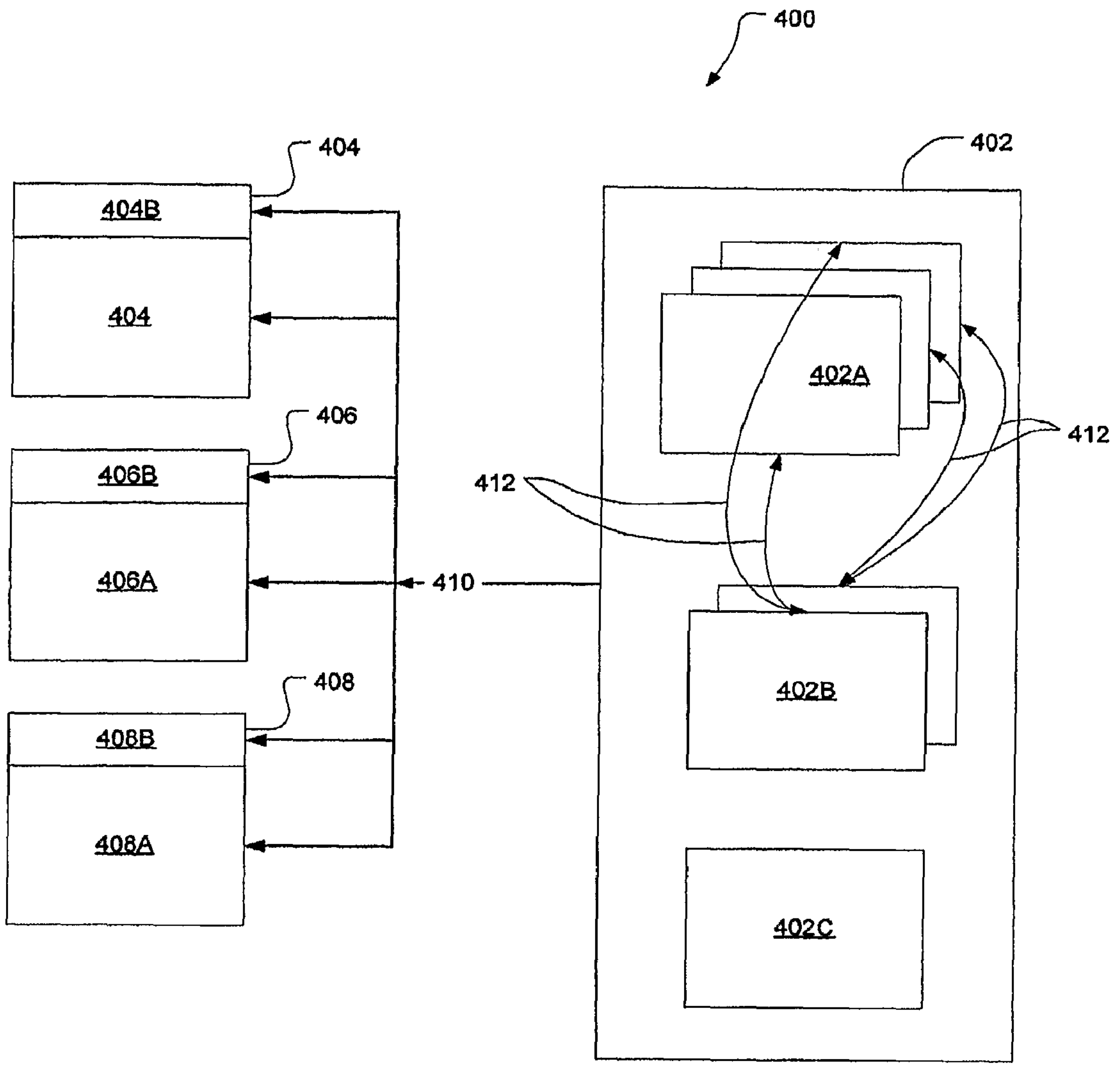
FIG. 4 depicts schematically the system of FIG. 1 illustrating the interaction of processes running on the server system.

Turning now to FIG. 4 which depicts an exemplary system 400 which is similar to the system depicted in FIG. 1. In the present embodiment, the system 400 comprises a centralised system control resource in the form of server system 402 which provides game and jackpot services implemented as a plurality of game processes, each designated 402A and a plurality of jackpot processes each designated 402B and combined jackpot and game processes for processes 402C, to a plurality of gaming machines 404, 406 and 408. Each gaming machine e.g. 404 includes a gaming console e.g. 404A corresponding to console 12 of FIG. 2) and auxiliary display e.g. 404B (corresponding to display 27 of FIG. 2). As will be appreciated, gaming machines 406 and 408 also include gaming consoles 406A and 408A respectively, and auxiliary screens 406B and 408B respectively. The gaming machines 404, 406 and 408 are connected to the server system 402 via a data network 410. As will be appreciated the data network can utilise a wide range of forms of connection including both wired and wireless connections, and may also include a combination of both.

As discussed, preferred embodiments of the present invention are configured to provide a game designer with improved flexibility when designing games and enable operational relationship between the control of a game and control of the jackpot to be configured in a wide variety of ways as opposed to a fixed manner of such interactions used in the prior art.

With this in mind, as illustrated in FIG. 4 game processes 402A and jackpot processes 402B are linked by logical connections 412 which enable inter-process communications of a type which cannot occur in stand alone jackpot systems. As will be appreciated by those skilled in the art such inter-process communications have been implemented in standard operating systems and further discussion of their nature is not necessary here.

From an alternative viewpoint, the combination of a game processes 402A and jackpot processes 402B can be considered as a part of a alone "terminal process" 402C which runs on the game server 402 by virtue of its association with a particular one of the gaming machines e.g. 404.

As will be appreciated, the configuration described herein in which game processes and jackpot processes are run either concurrently or sequentially on a server system e.g. 402 enables flexible definition of logical connections between the two types of processes. This gives rise to great flexibility for designers of games and jackpots. In this regard, it is even possible that rather than having fixed connections between the two that they can be varied during a game to enable jackpot definitions and triggering actions to change as a game session progresses. Moreover, it may also be possible to tailor the interaction and the triggering mechanisms for the award of a jackpot from player to player depending upon a large variety of factors which may be associated with both the game being played, the status or size of the jackpots able to be awarded and even on factors surrounding a player's identity or playing history. For example, if a player has not won a game on the system for a predetermined length of time, the player may become eligible to win a jackpot. Thus in this scenario, the nature of the interaction between the jackpot process and the game process is modified over the course of a player's playing session. To facilitate this form of interaction it is possible to define one or more "player processes" which represent the status of individual players or groups of players.

Moreover, the server system 402 can also run several "terminal processes" which represent the state of individual gaming machines e.g. 404 to 408 and "system processes" which control/monitor various operational parameters of the game system server 402, such as the time taken for various actions to be performed, the amount of money which has been received or paid out by the system, times when various events should occur, circumstances in which such events occur.

Figure 4A:
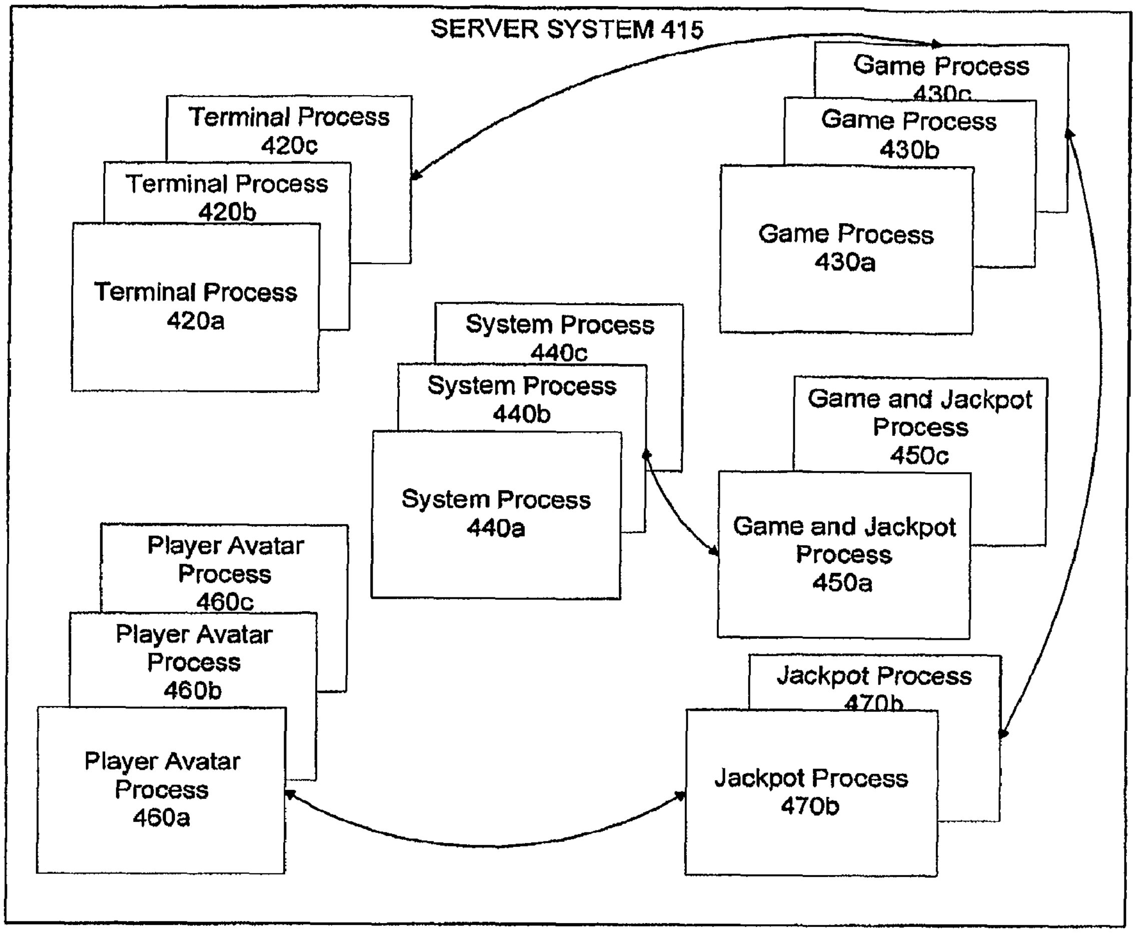
FIG. 4A depicts schematically a server system that is running several different types of processes within a gaming system of an embodiment of the present invention.

FIG. 4A depicts a server system 415 that is running a range of different types of processes which can interact with each other to provide services within a gaming system of an embodiment of the present invention. In this example the server system 415 is illustrated as running processes 20*a*, 20*b* and 20*c* which monitor the current state of the player terminals that are connected to the server system 415 in the gaming system. Processes 30*a*, 30*b* and 30*c* represent game processes which supply the players the ability to play a game while on their respective player terminals. Processes 40*a*, 40*b* and 40*c* are configured to monitor system parameters such as time, money entering and leaving the system, or the time and circumstances that various events occur within the system. Processes 50*a* and 50*b* represent processes where a jackpot has been designed as a stage or part of a game. Processes 60*a*, 60*b* and 60*c* represent processes that record and monitor information about a player. Processes 70*a* and 70*b* represent jackpot processes providing access to money within the system. As can be seen logical or inter-process communication exists between the processes. In certain embodiments of the present invention such interactions can be dynamically defined or triggered.

Figure 5:
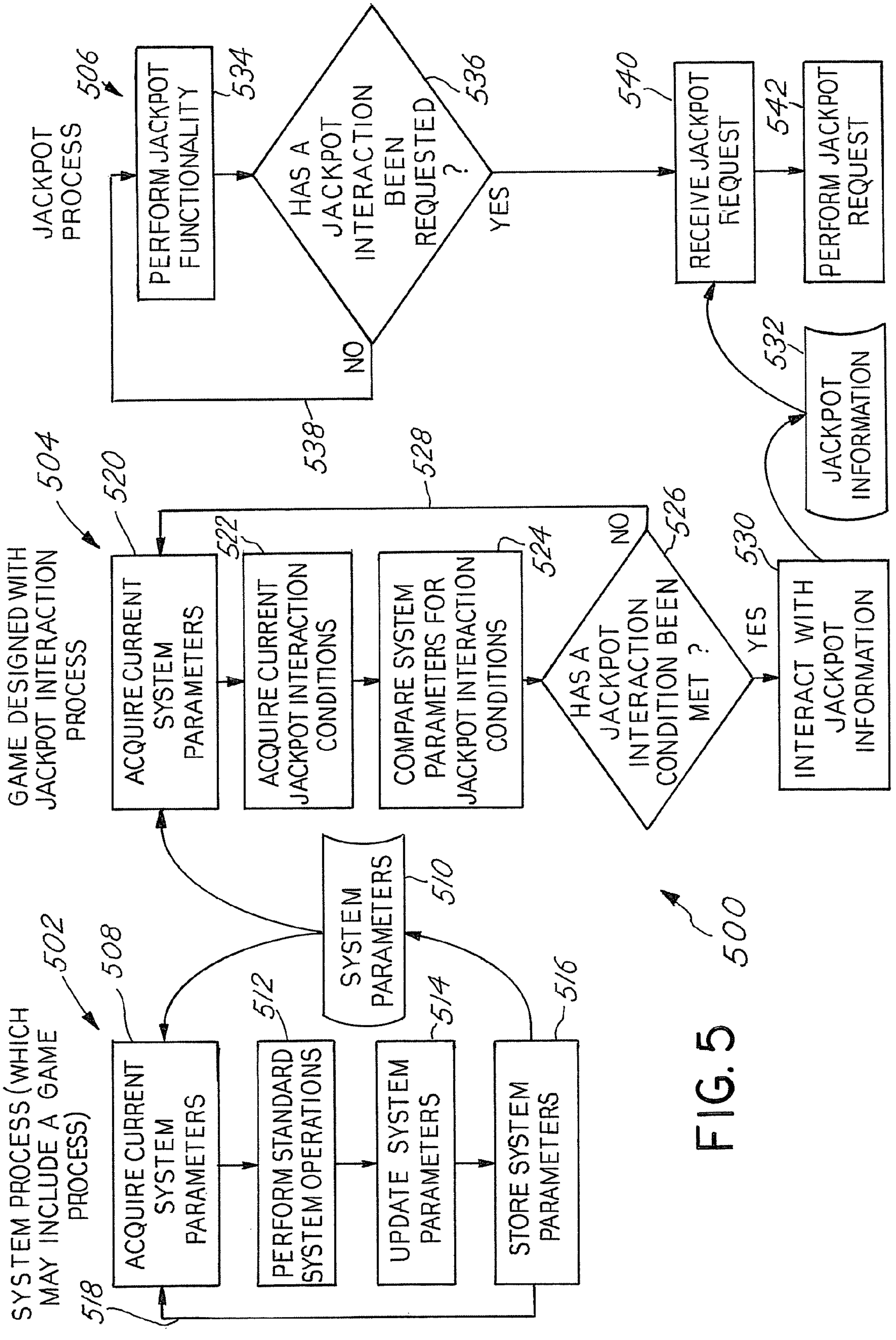
FIG. 5 depicts a flowchart showing the interaction of a two game processes, a system process and jackpot process in a further embodiment of the present invention.
Figure 6:
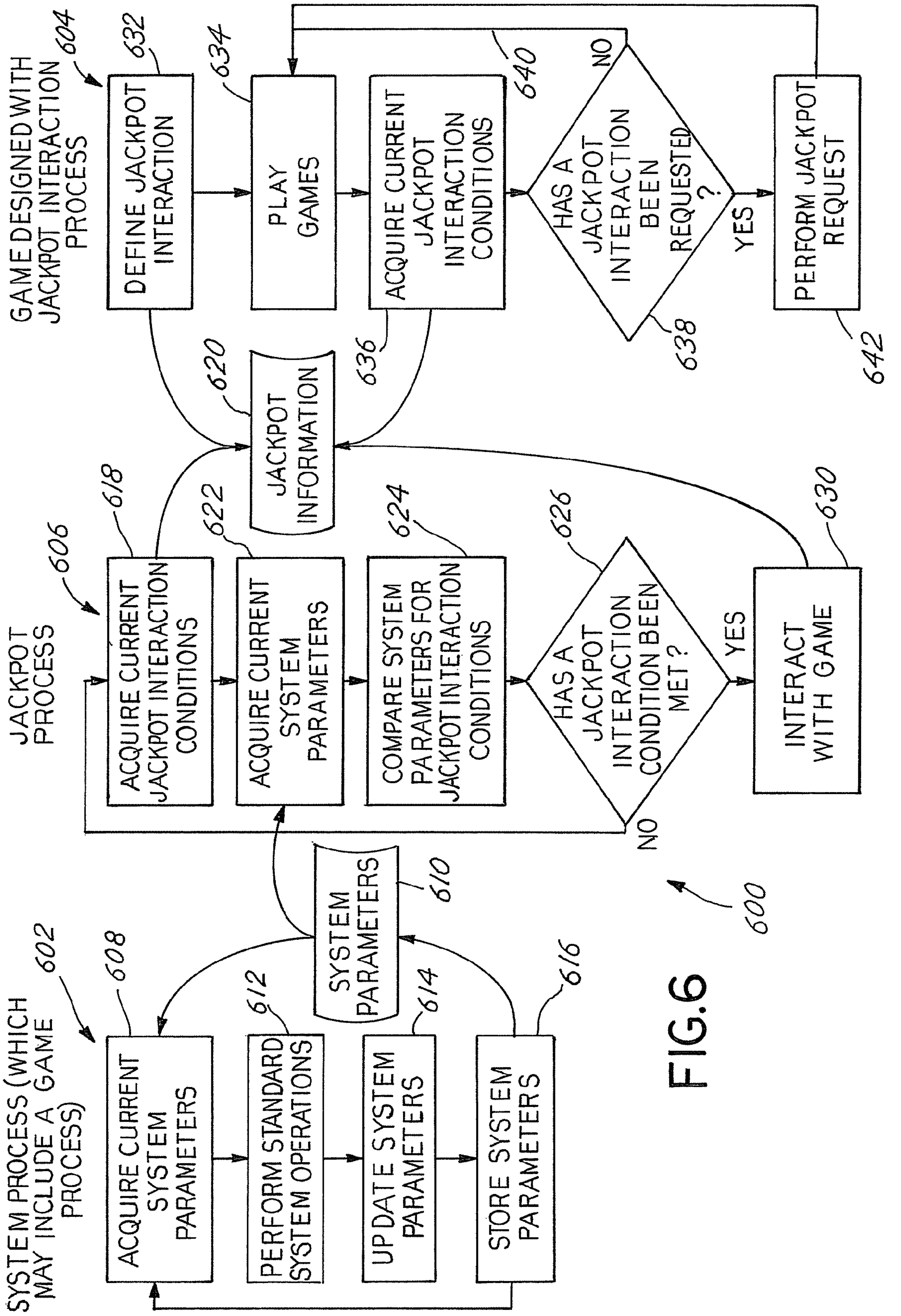
FIG. 6 depicts a flowchart showing the interaction of a game process, a system process and a jackpot process in another embodiment of the present invention.

In order to better understand some possible forms of interoperation of the various classes of processes implemented on the server system and services provided. FIGS. 5 and 6 are provided, which illustrate two different situations.

Referring now to FIG. 5, there is shown a flow chart depicting three processes being executed on a system control resource of a gaming system of an embodiment of the present invention. In this example the system control resource is implementing (possibly simultaneously) three processes 500 which include a system process 502, as well a game process 504 and a jackpot process 506. In this embodiment, the game process 504 is separate to the jackpot process 506 but is configured to interact dynamically with it. In this example, the system control resource can be seen as providing a game service and jackpot service to its associated gaming machines.

The system process 502 controls the processing of a wide variety of system-related parameters, including those related to the playing of actual games and the award of jackpots. For the sake of clarity, only those aspects of the system process 502 that may influence the award of a jackpot will be discussed herein.

From time to time the system process 502 will, determine whether the system passes from a state in which players are not eligible to win jackpots to a state in which they are eligible to win jackpots. In order for the system process 502 to operate it needs to have access to parameters influencing the award of a jackpot and to be able to update them when required, so that other processes (i.e. the game process 504 or jackpot process 506) can access the updated parameters to determine whether the updated parameters may cause the system to enter a state in which a jackpot may be awarded.

In a first step 508, the system process 502 acquires data 510 which reflects current system parameters. This data is acquired from a data storage which is configured to store data relating to such system parameters.

Thereafter, the system process 502 performs certain standard system operations, in step 512, and then updates the relevant system parameters, in step 514. Once the data has been updated, the system process 502, in step 516, causes updated system parameter data 510 to stored, in the system parameter data storage.

The system process 502 is run continuously, and returns, as represented by the arrow 518, to a state in which it once again performs step 508 of acquiring data 510 relating to current system parameters.

A game process 504 is run concurrently with the system process 502. The first step 520 of the game process 504 is to acquire system parameter data 510 from the system parameter data storage. As discussed above, the data system parameters 510 are constantly updated by the system process 502.

In step 522, the game process 504 acquires, from memory means (not shown), criteria defining the requirements for initiating a jackpot process, that is, to render a player (or players) eligible to win a jackpot. Once these criteria have been acquired in step 522, they are compared, in step 524 with the system parameters data to determine, in step 526, whether the criteria have been met and a jackpot process is initiated.

If the criteria are not met, then the game process 504 returns to step 520 and acquires data from the system parameter data storage 322, as represented by the arrow 528. On the other hand, if the jackpot interaction criteria are met, then, in step 530, the game process 504 initiates interaction with the jackpot process 506 by providing data to a jackpot information data storage 532. This data 532 constitutes information that will be used to define the operation of the jackpot process 506.

The jackpot process 506 also runs concurrently with the game process 504 and system process 502. The jackpot process 506 performs its normal jackpot functionality (e.g. incrementing a jackpot prize pool in response to a coin in signal from a gaming machine and sending the updated value to relevant gaming machines for display on their auxiliary jackpot displays) in step 534, and also periodically checks, in step 536, whether an interaction with the jackpot process has been requested by the game process 504.

If no interaction has been requested but the game process 504, then, as represented by the arrow 538, the jackpot process 506 returns to step 534. On the other hand, in step 540 if the jackpot process receives a request from the game process 504, the jackpot process 506 acquires the data from the jackpot information storage 532. As mentioned above, this information defines the nature of the desired interaction with the jackpot. Thereafter, in step 542, the jackpot process 318 performs the request.

FIG. 6 shows a flow diagram 600 depicting steps in a second embodiment of the present invention. Once again, the system control resource of a gaming system runs a number of software processes including a system process 602, a game process 604 and a jackpot process 606.

The process 600 is similar to the system 500 described in connection with the first embodiment, except that the system process 602 communicates directly with the jackpot process 606 rather than with the game process 604.

Steps reflected for the system process 602 are similar to those of the system process 502 described above. In particular, they include step 608 of acquiring system parameter data 610, which represents current system state of the gaming system. The system process 602 then performs the standard system operations in step 612, and when necessary updates the system parameters data in step 614. In step 616 the updated parameter data is stored in the system parameter data storage.

In this embodiment, the jackpot process 606, first, in step 618 acquires data 620 from a jackpot data storage means (not shown), which indicates criteria which the system parameters must satisfy in order for a jackpot interaction with the game process 604 to occur. Next, in step 622, the jackpot process 606 acquires system parameter data 610 from the corresponding data storage means. Then, in step 624, the jackpot process 418 compares the acquired system parameter data 610 with the jackpot data 620 acquired in step 618. The server system then makes a determination, in step 626, whether the jackpot interaction criteria have been met.

In the event that the criteria have not been met, the jackpot process 606 returns to step 618 again, as represented by arrow 628.

If the jackpot interaction criteria are met, then the jackpot process 606 initiates an interaction with the game process 604 in step 630. This involves storing relevant jackpot information 620 in the jackpot data storage means. As discussed further below, this stored data can be a jackpot interaction request which is to be received by the game process 604.

The game process 604 is run concurrently with the jackpot process 606. The game process 604 begins in step 632, with the game process defining the criteria which are to be satisfied in order for an interaction between the jackpot process and the game process to be established. The data defining these criteria is stored by the game process 604 as jackpot data 620. It will be recalled that this data is acquired by the jackpot process 606 in step 618 for comparison with actual system parameters 610

Once the jackpot interaction criteria data has been defined and stored as jackpot data 620 in step 632, the game process 604 proceeds in step 634, with processing the playing of games.

In the next step 636 the game process 604 obtains jackpot information data 620. As described above the jackpot process 606 has previously stored a request for an interaction with the game process 604 by updating the stored jackpot data 620. In step 636, the game process 606 acquires the relevant jackpot data 620 and, a determination is made, in step 638, as to whether that information indicates that such an interaction request has been made, that is, whether an interaction between the jackpot process 606 and the game process 604 is required.

If the game process 604 determines that an interaction between the jackpot and game processes is not required, then the game process returns, to step 634 as represented by arrow 640. On the other hand, if the game process 604 determines an interaction between the jackpot and game processes is required, then in step 642 the game process performs the relevant request by implementing the interaction with the jackpot process 606.

Table 1 includes a number of exemplary conditions or criteria that may be used by the various processes, which are running on the server system in an embodiment of the present invention, to trigger (i.e. request) a jackpot interaction. Due to the flexibility of the systems described herein those skilled in the art will readily be able to devise other criteria or conditions that can be used to trigger a jackpot interaction in other embodiments.

TABLE 1

| Initiating process or entity | Criterion |
|---|---|
| Terminal | Player Terminal has just recovered from an error condition. |
| Game | The number of different games being played on the system has exceeded a threshold. |
| | The number of games created by a specific manufacturer has exceeded a threshold. |
| System | The accumulated money for system lifetime has exceeded a threshold. |
| | The accumulated daily earnings of the system have exceeded a threshold. |
| | System has just started and the jackpot will be available for a certain time period. |
| | System has just started for the day and the jackpot will be available for a certain time period. |
| | Current rate of money entering the system has exceeded a threshold. |
| Player | A number of players identifiable to the system as a number of groups are present. |
| | A player has not won on the system for a defined time period. |
| | This is the first time the player has played on the system. |
| | The player has played on the system a number of times. |
| | The player's accumulated losses have exceeded a certain threshold. |
| | The players accumulated wins has exceeded a certain threshold. |
| Jackpot | Another Jackpot has just been won. |
| Combined | A jackpot has just been won by a player and subsequently that player becomes eligible for another jackpot (possibly with an increased chance of winning, possibly resulting in an avalanche of jackpots effect). |
| | A jackpot has just been won by a different player (consolation prize). |
| | The number of different games being played by a group has exceeded a threshold. |

A wide variety of jackpot interactions (or data exchanges) can be defined in embodiments of the present invention, as opposed to prior art jackpot systems which only permitted limited interactions such as the incrementing of a jackpot value and the triggering the award of the jackpot. Table 2 is a list of exemplary jackpot processes that may be implemented in embodiments of the present invention. Others will be readily able to be determined by those skilled in the art.

TABLE 2

| Source | Destination | Name | Parameters | Comment |
|---|---|---|---|---|
| Game | Jackpot | Increment Jackpot value | Amount | Increment a jackpot by a certain amount |
| Game | Jackpot | Decrement Jackpot value | Amount | Decrement a jackpot by a certain amount |
| Jackpot | Game | Request Increment value | | Request the amount that a jackpot should be incremented |
| Jackpot | Game | Request Decrement value | | Request the amount that a jackpot should be decremented |
| Game | Jackpot | Win | | Inform jackpot that prize has been won |
| Jackpot | Game | Display Value | amount | Send an amount to be displayed by the game |

TABLE 2-continued

| Source | Destination | Name | Parameters | Comment |
|---|---|---|---|---|
| Jackpot | Game | Stop Displaying Value | | Inform a game to stop displaying a jackpot value |
| Jackpot | Game | Start Displaying Value | amount | Inform a game to start displaying a jackpot value |
| Jackpot | Game | Inform win | | Inform a game that the jackpot has been won |
| Jackpot | Game | Transmit win | amount | Inform the game of the amount won |
| Game | Jackpot | Request win | | Request that a jackpot send the win amount to the game |
| Jackpot | Game | Request portion | amount | Request that a jackpot send a portion of its pool to the game |
| Jackpot | Game | Establish connection | Time or Event and Address or Jackpot Id or machine id or player id or game id or process id | Establish a connection to a process, game, machine, player another jackpot until a time period has expired or an event occurs. |
| Jackpot | Game | Close connection | Address or Jackpot Id or machine id or player id or game id or process id | Close a connection to a process, game, machine, player another jackpot. |
| Jackpot | Game | Suspend connection | Time or Event and Address or Jackpot Id or machine id or player id or game id or process id | Suspend a connection to a process, game, machine, player another jackpot until a time period has expired or an event occurs. |
| Game | Jackpot | Establish connection | Time or Event and Address or Jackpot Id or machine id or player id or game id or process id | Establish a connection to a process, game, machine, player another jackpot until a time period has expired or an event occurs. |
| Jackpot | Game | Close connection | Time or Event and Address or Jackpot Id or machine id or player id or game id or process id | Close a connection to a process, game, machine, player another jackpot. |
| Jackpot | Game | Suspend connection | Time or Event and Address or Jackpot Id or machine id or player id or game id or process id | Suspend a connection to a process, game, machine, player another jackpot until a time period has expired or an event occurs. |
| Game | Jackpot | Split Jackpot | Number | Split a jackpot into a number of equal portions |
| Game | Jackpot | Form multiple Jackpots | Number, period | Split a jackpot into a number of equal portions for a time period |
| Game | Jackpot | Add Jackpot | Jackpot id 1, Jackpot id 2, value, period | Add one jackpot value to another for a period of time |
| Game | Jackpot | Transfer Jackpot | Jackpot id 1, Jackpot id 2 . . . Jackpot n | Transfer a portion of one jackpot value to another or split a jackpot and divide it up into a number of others |
| Game | Jackpot | Disperse Jackpot | Jackpot id 1, Jackpot id 2 . . . Jackpot n, period | Split a jackpot and divide it up into a number of others for a period of time |
| Game | Jackpot | Form Super Jackpot | Jackpot id 1, Jackpot id 2 . . . Jackpot n | Combine a number of jackpots into one |
| Game | Jackpot | Transmit Player Stake | Value and machine id or player id or game id or process id | |
| Game | Jackpot | Request player stake | | |
| Game | Jackpot | Receive player stake | Value and machine id or player id or game id or process id | |
| Game | Jackpot | Define Initialisation value | Jackpot Id, Value | Define the initialisation or startup value for a jackpot |
| Game | Jackpot | Define Ceiling Value | Jackpot Id, Value | Define the maximum limit or ceiling value for a jackpot |
| Game | Jackpot | Define Parameter | Jackpot Id, “String”, Value | Define a parameter to be labelled “string” and initialised with the value |
| Game | Jackpot | Supply Conditional control | Jackpot Id, Control 1, Operator 1, Parameter 1, Action 1 . . . Control n, Operator n, Parameter n, Action 1 | Define a jackpot’s behaviour when defined conditions are met. This will include the condition a parameter must achieve and the action needed to be performed. |

TABLE 2-continued

| Source | Destination | Name | Parameters | Comment |
|---|---|---|---|---|
| Game | Jackpot | Request | Command Name | Request the parameters for any of the commands for the command with the name Command Name within this table. |

Two exemplary embodiments of the operation of a system control resource in the form of a server system will now be described to illustrate the flexibility that embodiments of the present invention offer. In a first embodiment depicted in FIG. 7, a jackpot is able to be won by a player of a first gaming machine when the total system credit falls in a certain range, a player of a second gaming machine is eligible to win the jackpot when the total system credit falls in a second range. This is an example of a system-triggered jackpot interaction.

Figure 8:
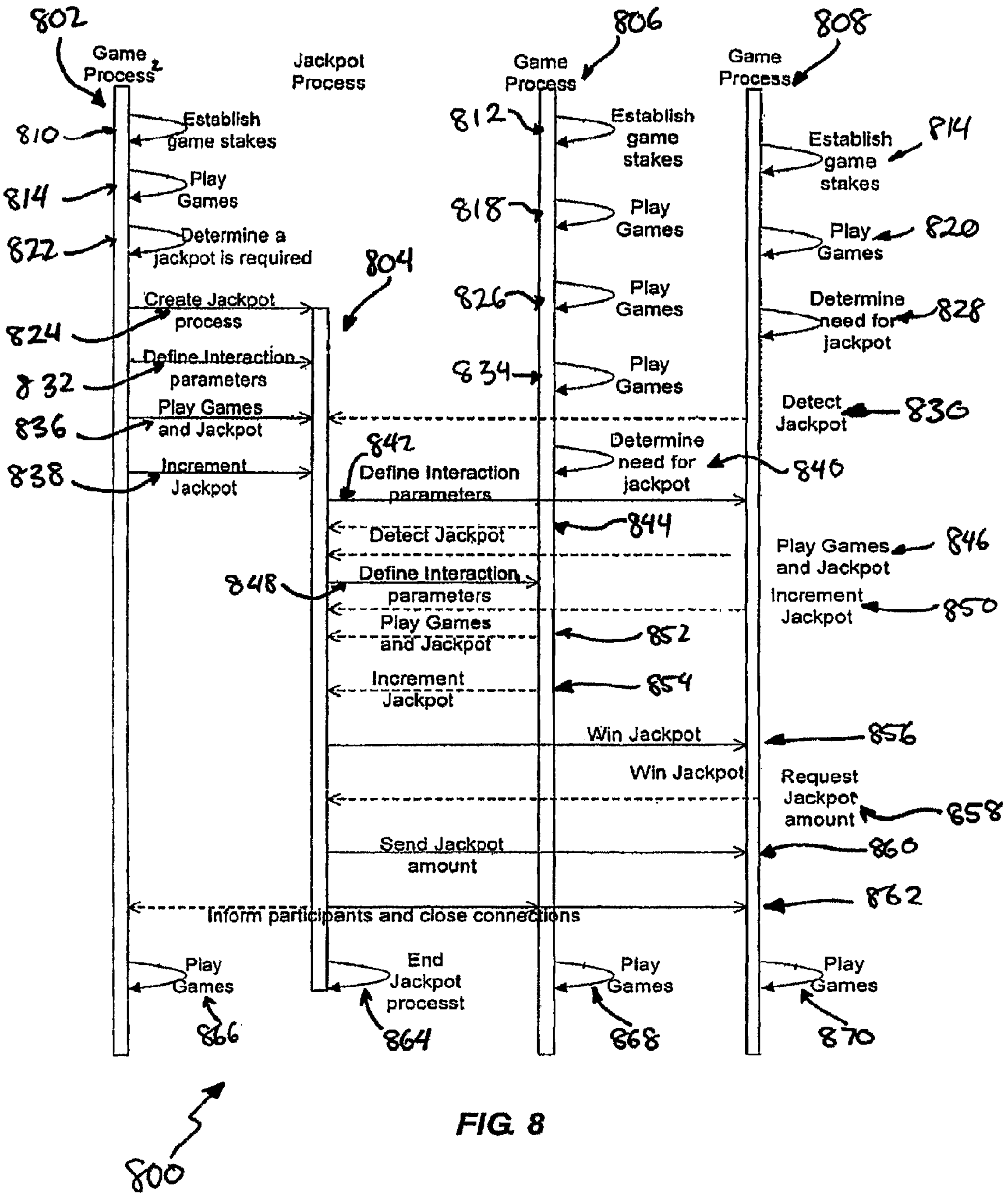
FIG. 8 depicts a flowchart showing the interaction of a three game processes and jackpot process in yet another embodiment of the present invention.

In the second embodiment, depicted in FIG. 8, the games determine that a jackpot should be made available for winning, and if necessary create a jackpot. For example a particular type of win on the gaming machine may trigger the activation of a jackpot. In this case, enabling the jackpot can be viewed as a bonus awarded by the machine. However, once created, the jackpot is shared by a group of gaming machines, such that if one of the machines wins the jackpot the others are no longer eligible to win it, until the next jackpot is created.

Figure 7:
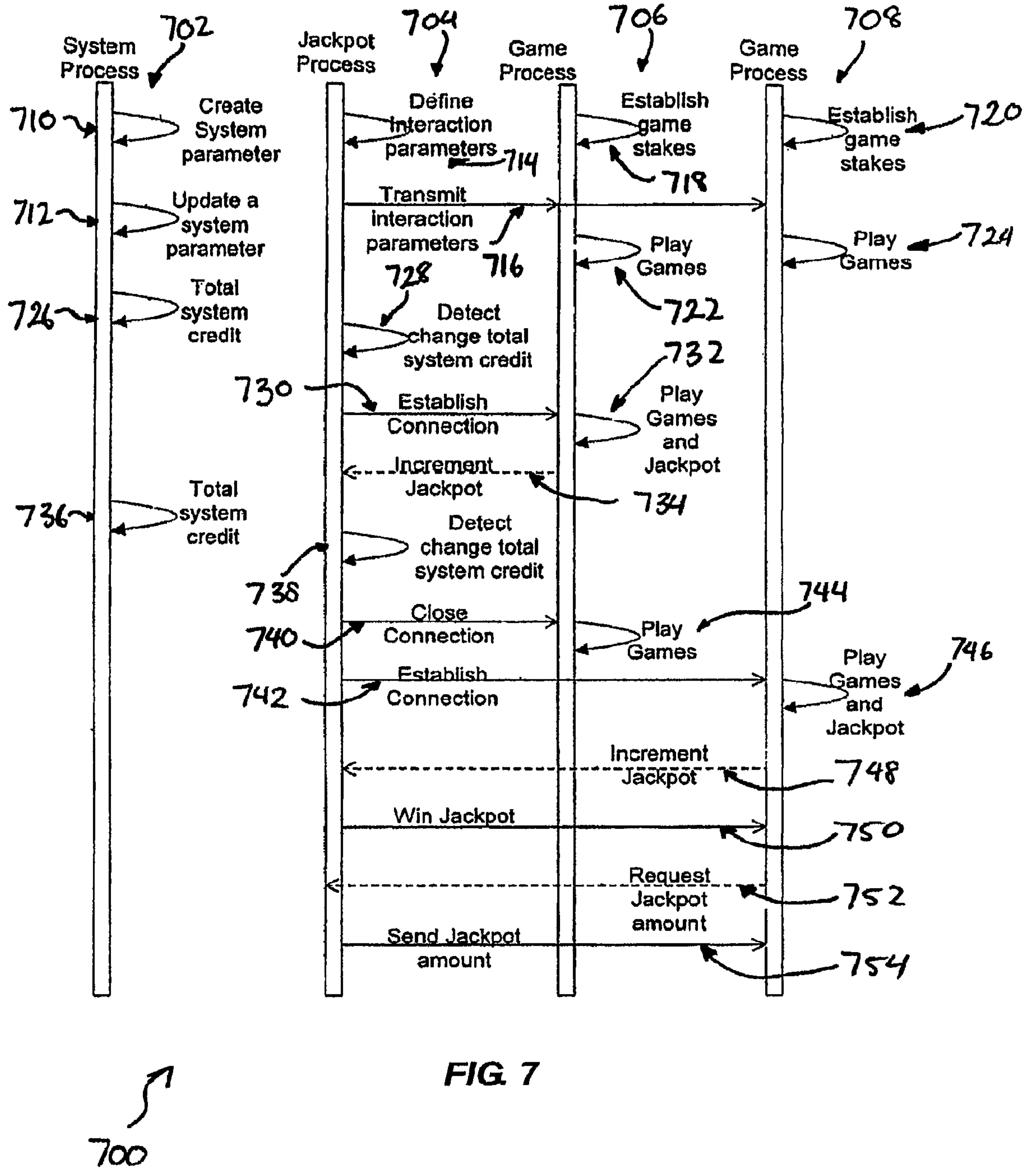
FIG. 7 depicts a flowchart showing the interaction of a two game processes, a system process and jackpot process in a further embodiment of the present invention.

Turning now to FIG. 7, it can be seen that the server system is running four concurrent processes namely a system process 702 jackpot process 704 first game process 706 and second game process 708.

The flowchart 700 depicts the operation of each process over a given time interval as a vertically aligned set of steps. At an earlier time than the depicted interval each of the processes was created and at the start of the depicted time period each of processes 702, 704, 706 and 708 is running and performing its standard functionality. In this regard the standard functionality of the system process results in system parameters being created in step 710 and subsequently updated in step 712.

The jackpot process 704 defines, in step 714, one or more criteria which must be satisfied in order for the jackpot process to trigger an interaction with a game process e.g. 706 and 708. The game processes 706 and 708 each represent a game that is being played by a player of a respective gaming terminal. In the present embodiment the interaction of the jackpot process 704 with the game processes 706 and 708 means that the game processes are able to trigger a jackpot winning event if the game process satisfies at least one jackpot winning criterion. As discussed above and set out in other Table 2 form other forms of jackpot interaction are also possible.

The jackpot interaction criterion (or criteria) as defined in step 714 by the jackpot process 704 is then transmitted to the game processes 706 and 708 in step 716.

In the present embodiment a jackpot is made available to be won by a user of a particular gaming machine when the total system credit lies in a first predetermined range, and the ability to win the jackpot moves to a user of a different gaming machine when the total system credit lies in a second predetermined range. If the total system credit is less than a predetermined minimum, then there is no interaction between the jackpot and any of the games.

During the game processes 706 and 708, in steps 718 and 720, respectively, the amounts wagered by their respective players are determined. Subsequently the in steps 722 and 724, the game processes determine the outcomes of the games currently being played at their corresponding terminals.

Over time, with additional credits being put into the gaming machines and payouts being made to players the total system credit will change. This parameter is monitored by the system process 702 in step 726. Since the total system credit value is the parameter that triggers a jackpot interaction in the present embodiment the jackpot process 704 monitors this parameter that is continually updated by the system process 702. When the jackpot process 702 at step 728 detects that total system credit is greater than the predetermined threshold for initiating the interaction between the jackpot process 704 and the game processes 706 and 708 the jackpot process initiates an interaction with the game process 706, in step 730, by establishing a connection with it in step 730.

The game process 706 reacts in step 732 by playing games in which the jackpot may be won.

The game process 706 is adapted to cause the gaming machine to display the current jackpot value to the player. During these games in which the jackpot can be won part of a player's stake is contributed or allocates to the jackpot pool. In response to this the jackpot is incremented by the jackpot process 704 in step 734.

During this time, the other game process 708 is determining the outcome of normal games without any interaction with the jackpot process 704.

At some point in time, the system process 702, in step 736, again updates the total system credit, which is detected by the jackpot process 704 in step 738. In step 738 the jackpot process 704 detects that the system credit has increase beyond a predetermined threshold which triggers the jackpot process to "move" the jackpot to another gaming machine, i.e. causes the jackpot process 704 to interact with a different game process 708. This is performed in step 740 in which the jackpot process 704 closes the connection with game process 706, and in step 742 in which it establishes a connection with the other game process 708 in step 742.

The game process 706 reverts, in step 744, to processing the normal games without any interaction with the jackpot process 704. The game process 708 begins to process the games in step 746 such that the jackpot can be won. During these games the game process 708 contributes or allocates part of its stakes to the jackpot pool as indicated in step 748.

The jackpot process 704 determines that game process 708 has won a jackpot and communicates this to the game process 708 in step 750. Then, in step 752, the game process 708 transmits a request to the jackpot process 704, for the amount of the jackpot that has been won. This information is then transmitted from the jackpot process 704 to the game process 708 in step 754.

Referring to the system 800 of FIG. 8, there is shown a diagram similar to that of FIG. 7, which illustrates the interactions between a jackpot process 804 and three game processes 802, 806 and 808. Once again the operations of each process 802, 806, 808 are depicted over a predetermined time period. As can be seen, at the start of the time period the jackpot process 804 is not running.

At the beginning of the period shown, the three game processes 802, 806 and 808 are each processing the outcomes of standard games being conducted on respective gaming terminals (not shown). Game play in each of the game processes 802, 806 and 808 progresses by establishing the stakes (steps 810, 812 and 814, of game processes 802, 806 and 808 respectively). This is followed by the actual playing of the games in steps 814, 818 and 820 respectively.

In step 822 game process 802 determines that a point has been reached where a jackpot process is needed. The game process 802 may attempt to locate a jackpot (not shown), and if such a jackpot is not present (as in the present example), the game process 802 causes the server to create a jackpot process in step 824.

In the meantime, game process 806 continues to process normal games in step 826.

At 828 game process 808 determines that it also needs access to a jackpot. As jackpot process 804 is already running and is of a suitable type there is no need to spawn another jackpot process. This is detected by the game process 808 in step 830.

Game process 802, after creating the jackpot process 804, defines and transmits the interaction criteria for the jackpot process 804 in step 832.

The game process 806 continues to process normal games during this period as indicated in step 834.

The game process 802 proceeds to process games in association with the jackpot process 804 in step 836. During these games part of the stake wagered by the player is contributed to the jackpot pool. The incremental contributions to the jackpot pool are communicated to the jackpot process in step 838.

Next, game process 806 determines that it needs a jackpot in step 840.

The next step to occur in the jackpot process 804 is step 842 in which the jackpot process 804 defines, and transmits to the game process 808, the current jackpot interaction parameters. The game process 808 then proceeds, in step 846, to process games in association with the jackpot process 804. The game process 808 increments the jackpot total, as described above, in step 850.

Turning now to game process 806, which in step 844, detects the presence of the jackpot process 804. The jackpot process 804 then sends the current jackpot interaction criteria to game process, 804 in step 848. Then, in a similar manner to the other game processes, the game process 806 processes games in association with the jackpot process 804 in step 852. In step 854, the game process 806 communicates stake contributions to the jackpot pool thus incrementing it.

All three game processes 802, 806 and 808 then process games in a state in which they are eligible to win a jackpot. At some point the jackpot process 804 determines that one or more jackpot winning criterion have been satisfied by the game process 808. This triggers the win of the jackpot and a notification is transmitted, in step 856 from the jackpot process 804 to the game process 808. The game process 808 then transmits a request, in step 858, to the jackpot process 804 for the amount of the jackpot prize that been won. This information is transmitted by the jackpot process 804 to the game process 808, in step 860.

The jackpot process 804, in step 862, then transmits a communication to all of the game processes, 802, 806 and 808, informing them that the jackpot has been won, and closes its connections with those game processes.

The jackpot process 804 then terminates in step 864. Thereafter, the game processes 802, 806 and 808, in steps 866, 868 and 780, respectively return to processing games without being eligible to win a jackpot.

Embodiments of the present invention allow the nature of the interactions between jackpot processes and other processes running on server system to be dynamically defined. By changing the nature or requirements for a jackpot interaction over the course of a game or playing session or through the passage of time, or as a function of a system variable, e.g. system credit etc. new and interesting playing features can be implemented. Several such examples will now be explained, although the present invention should not be considered as being limited to the exemplary forms described herein.

One example is a game in which there are specific time periods during which the game processes are interacting with the jackpot process. In such a case, the game designer may design the jackpot winning criteria such that, if a jackpot is not won by a player during that time period, the probability of winning the jackpot during the subsequent such period will increase (or decrease) for that particular player. In addition by virtue of the previous jackpot win, the jackpot amount available for that player to win may differ to than that available to other players.

Alternatively game processes can be configured to change the way they play if a particular jackpot event occurs, e.g. if a player has won a jackpot the game processes for all other players that also had access to that jackpot, but did not win it, can automatically enter a consolation game feature. To achieve this, the system process can be designed to keep track of all the players that are interacting with the jackpot, and of those players that have won the jackpot.

As described above, in an embodiment of the present invention, jackpots may constitute a stage (or phase) of a game rather than being in the nature of a distinct service. Generally, a conventional game service is comprised of several stages such as a base game, a secondary feature, and a gamble feature, each of which may be implemented as separate software processes. A further stage namely a jackpot stage, is also possible in an embodiment of the present invention. Thus, a player may play a base game which triggers a jackpot feature in which the player interacts with the jackpot process only during the jackpot stage.

The flexibility available in embodiments of the present invention can be used in other ways as well, for example, the percentage of each player's stake that is contributed to a jackpot pool may be varied. This can be done to achieve a desired average contribution to a jackpot pool across a plurality of gaming machines. In this regard, it may be desired for each machine's contributions to the jackpot to amount to 1% of the total amounts wagered by players. Accordingly, the system may be designed such that, for every 1500 games that are played, 1485 games will be played without the games entering the jackpot stage, and 15 games will be played in which the games enter the jackpot stage. If the portion of wagers allocated to the jackpot pool during non-jackpot stages is nil, and that allocated during jackpot stages is 100%, and assuming that the bet strategy remains constant, then the average contribution to the jackpot will be 15/1500 of the total amount wagered, that is, the desired 1% of the wagered amount, during the 1500 games.

The configuration of the present embodiment, in which jackpots constitute stages or phases of games, facilitates designing games in such a way that the results of the jackpot stages of games will determine whether further games are initiated. For example, in the event that a jackpot is not won, the next stage of a game process may be a series of free games, while if the jackpot is won, the game process returns to a "base" game stage, that is, to the start of a regular game. This may be distinguished from known systems in which the decision to award a jackpot, is often based on the outcome of a game but where the question of whether any further games are to follow the jackpot is not based on the outcome of the jackpot.

Figure 9:
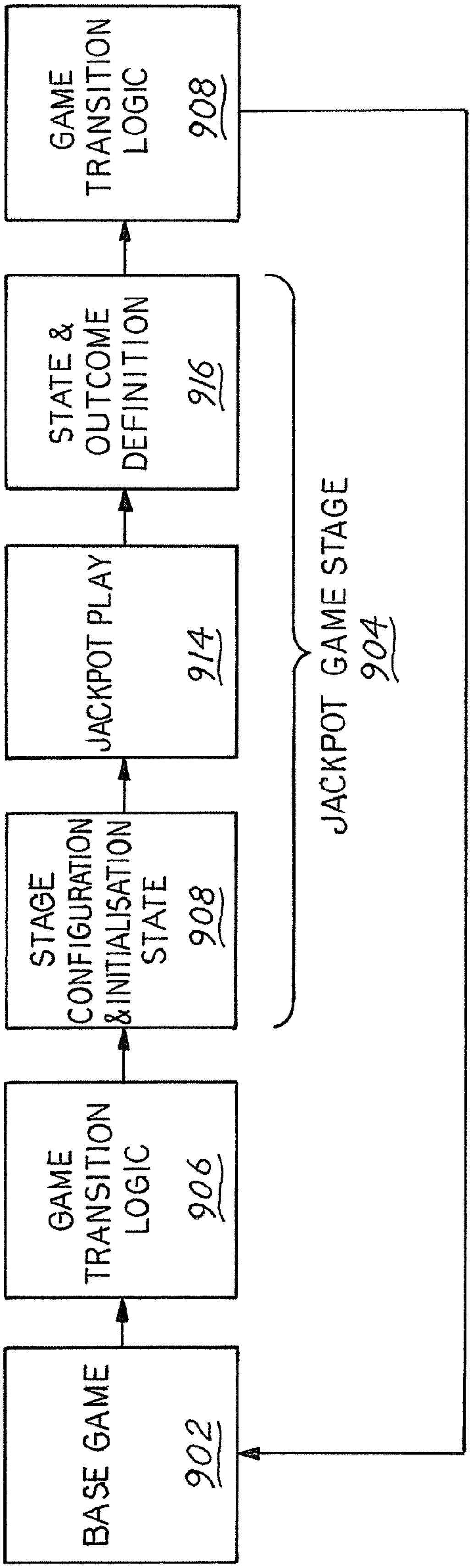
FIG. 9 show schematically the stages in a game process that includes a jackpot process in an embodiment of the present invention.

Reference is now made to FIG. 9 which is a flow diagram relating to a game process, generally designated 900, which includes a base game process 902 for controlling a base game, and a jackpot stage 904 forms an integral stage of the game process. The diagram represents individual phases of the game 900 as blocks.

Logic steps 906 and 908, control the transition from one game stage to a subsequent stage, and are thus operable both before and after the jackpot stage 904. They are similarly operable between other stages of the game 900 to control transitions to and from those stages.

During the course of such a game 900, when at least one relevant criterion for initiating an interaction with a jackpot is satisfied, the game transition logic 914 determines that a jackpot stage must be entered. When this occurs, control is transferred to the jackpot stage 904 from the base game stage 902. This includes initialising the jackpot stage 904 with any existing states that have been established by previous stages. This initialising is constituted by the stage-configuration and state-initialisation step 910.

An example of such a state with which the jackpot stage 912 needs to be initialised is the current credit of a player and the player bet strategy and the current jackpot starting value(s). In addition, the operating parameters of the jackpot stage are defined.

In one embodiment, the game 900 stores a persistent, running jackpot value which is incremented each time the jackpot stage 904 is entered, unless the jackpot is won. As part of the jackpot stage-configuration and state-initialisation process 912, this persistent value is provided to the jackpot as the jackpot starting value. In different embodiments, the jackpot value may be a persistent running value for the gaming system as a whole, which may be established by a system process or it may be a respective persistent running value for each individual player in which case it will be established by a player process.

Alternatively each jackpot may be played independently of earlier jackpots. In this case, each time a jackpot stage 904 is entered, the jackpot stage initialisation may involve resetting the jackpot to a predetermined jackpot start value.

Other types of information with which the jackpot stage 904 may be initialised include the proportion of the player's stake that is used to increment the jackpot value, and the duration of the jackpot stage.

Once the jackpot stage has been initialised, the game 900 can then be played in the jackpot play step 914. The jackpot play step 914 is played using the parameters defined in the preceding, stage-configuration and state-initialisation step 912. After the jackpot play stage 914 is complete, relevant information relating to the outcome of the jackpot play stage and the state of the jackpot play stage is defined and stored persistently in the step 916. The defining of information relating to the jackpot play stage 914 may include information which is subject to metering and logging, and other market-specific functionality.

Figure 10:
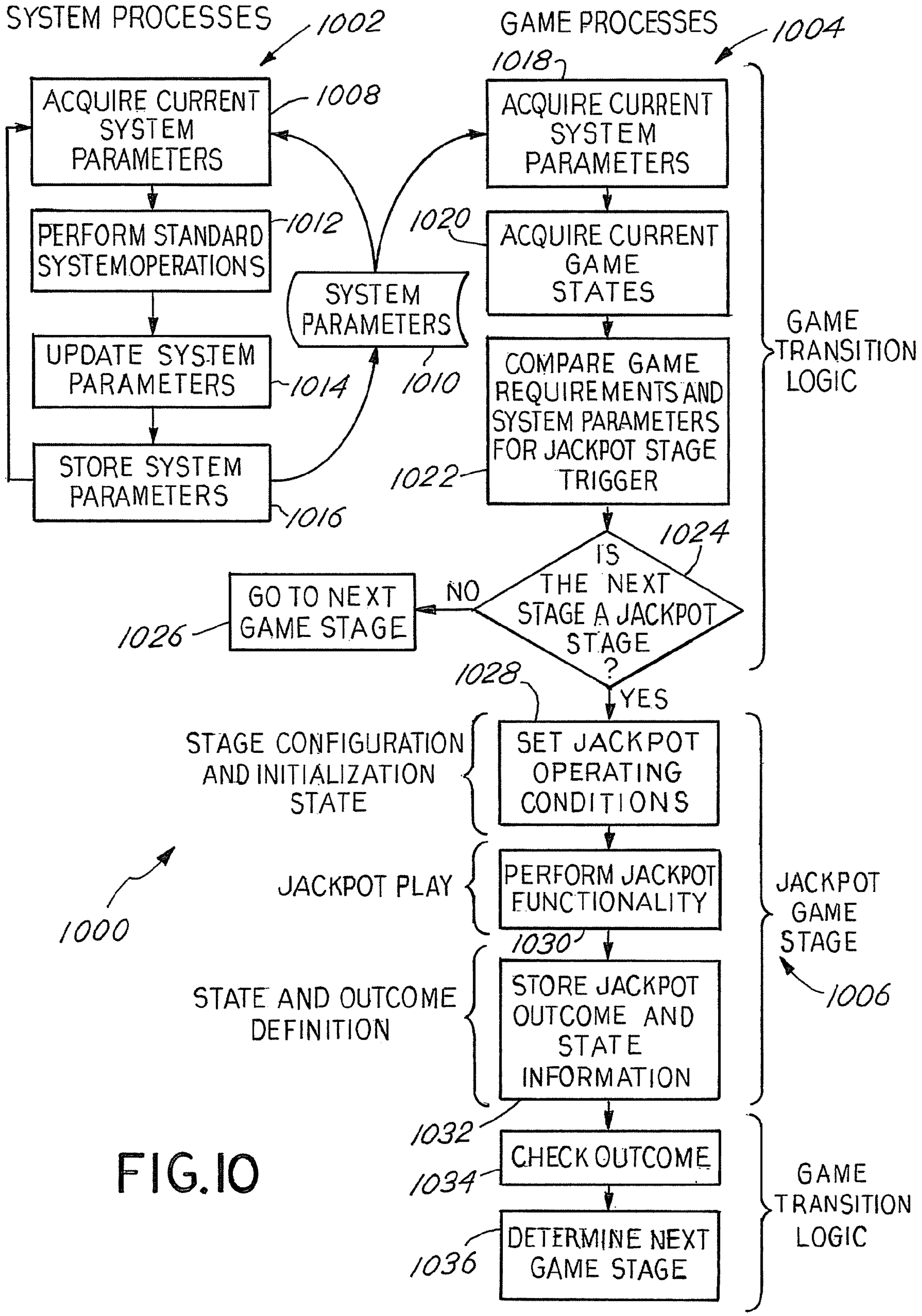
FIG. 10 depicts a flowchart showing the interaction between a game process incorporating a jackpot process of the type depicted in FIG. 9, and system process in an embodiment of the present invention.

FIG. 10 illustrates a flow diagram 1000 depicting a system process 1002 and a game process 1004 running on a data processing resource of a gaming system. The game process is similar to that described in FIG. 9 in that the game process 1004 includes a jackpot stage 1006 as an integral part of it.

As in the case of the embodiments described in relation to FIGS. 5 and 6, the only part of the system process 1002 shown is that part which deals with the accessing and updating of system parameters relevant to the game process 1016. The system process 1002 will also implement other functionality that will be known to those skilled in the art and will not be described here.

In step 1008, the system process 1002 acquires relevant stored system parameters 1010 from a system parameter storage means. The system process 1002 then continues with its normal functionality at 1012, and in step 1014, updates the acquired system parameters. The updated parameters are then stored as the system parameter 1010 in step 1016.

The game process 1002 begins a stage of game play in step 1018, by acquiring the system parameters 1010 from the system parameter storage. It then checks the relevant parameters of its internal game state in the step 1020.

The system parameters 1010 include the criteria for determining when the jackpot stage is to be entered. In step 1022 if these criteria are compared, with the game parameters acquired in the step 1020 relating to the internal game state of the game process 1004. If the compared parameters do not correspond to one another in step 1004 then the game process 1004 proceeds to the next game stage (as opposed to a jackpot stage) in the step 1026.

On the other hand in step 1024, if the compared parameters correspond, the game process 1006 then initialises its jackpot stage 1006 by setting the jackpot operating conditions, in step 1028. This step corresponds to the stage-configuration and state-initialisation step 912 described in relation to FIG. 9 above.

As the jackpot stage 1006 is an integral part of the game 1004 as a whole, the operating conditions which are set in step 1028 are internal to the game process 1004.

The game process 1004 then processes the jackpot feature in the step 1030. After the play of the jackpot feature is completed, information pertaining to the results of the jackpot, is stored, in step 1032.

In step 1034, the results, and in particular the outcome of the jackpot stage, are checked, and used in step 1036 to determine the nature of the next stage of the game.

The results of the jackpot may indicate that the jackpot has or has not been won, and they may also indicate other parameters of the outcome of the jackpot. For example, if the results indicate that the jackpot has not been won but they include parameters which match certain predetermined criteria, the next stage of the game may modified so as to increase the probability of winning a jackpot the next time the jackpot stage is entered. For example in a jackpot stage where the probability of winning the jackpot is dependent on the amount of the wager made by a player, the player's stake may be doubled for purposes of winning a jackpot, but not for how much it is contributing to the jackpot.

Alternatively, in light of the jackpot results, the next stage of the game may involve a normal game in which a small portion of the jackpot pool is made available to the player as part of the player's wager. This will effectively increase—for example, double—the amount bet by the player without any actual out-of-pocket cost to the player.

Several examples of jackpot arrangements able to be implemented in a gaming system operation according to an embodiment of the present invention will now be described. As in each of the embodiments described all game outcomes and substantive game processing is conducted on a centralised server system which is connected to each of the gaming machines and jackpot displays connected to the gaming system.

Figure 11:
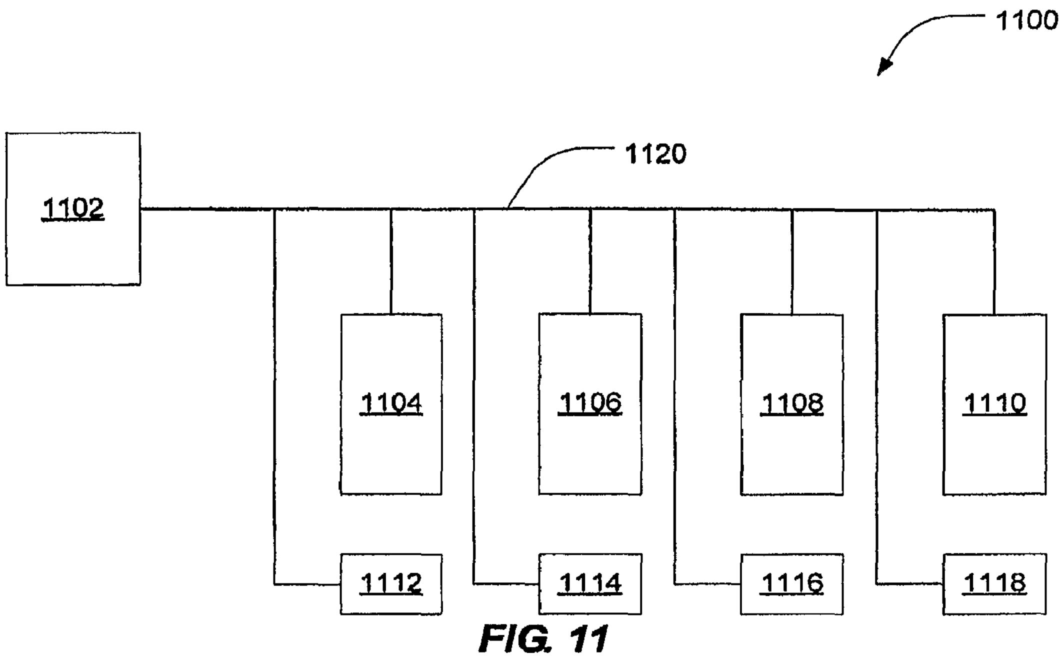
FIG. 11 depicts a schematic diagram of a gaming second system operating in accordance with an embodiment of the present invention.

Turning now to FIG. 11 which shows a gaming system 1100 according to an embodiment of the present invention. The gaming system 1100 includes a game outcome server 1102 and four networked gaming machines 1104, 1106, 1108 and 1110. Also connected to the game outcome server 1102 are four jackpot display 1112, 1114, 1116 and 1118. Each of the gaming machines and jackpot displays are connected to the game outcome server system 1102 via a data network 1120. In use, each jackpot display displays the current status and value of a different jackpot. As will be appreciated from the foregoing description, each separate jackpot service is provided by way of a jackpot process running on the game outcome server a data processing resource of the system 1100, which in this case is the game outcome server 1102. In use, each of the jackpots 1112 to 1118 are associated with respective gaming machine 1104 to 1110. The association between a gaming machine e.g. machine 1104 and respective jackpot e.g. 1112 is such that a player of the gaming machine 1104 may be eligible to win only the jackpot associated with it e.g. jackpot 1112, and only makes contributions to that jackpot value.

It will be appreciated that the value of each of the jackpots 1112 to 1118 will depend on the level of contributions made to it by players of their associated gaming machines 1104 to 1110. Accordingly, it is likely that each of the jackpot totals 1112 to 1118 will be different to one another. Accordingly, the desirability of winning each of the jackpots will be different, and it is this feature that the current embodiment of the present invention exploits to add a new aspect to a player's gaming experience. In this regard, the process for awarding a jackpot to a player includes the possibility of awarding the jackpot associated with another player's machine.

According to this embodiment of the invention, the likelihood of each player winning the jackpot associated with that player's gaming machine can be reflected, as m %. On the other hand, the likelihood that each player will win a jackpot associated with another one of the gaming machines is n %.

In one preferred embodiment, the value of m is greater that the value of n. In other words, the chance that a player will win the jackpot associated with his own gaming machine is greater than the chance that the player will win a jackpot which is associated with another of the gaming machines.

Also in an embodiment, the system 1100 can be configured such that the actual values of m and n are variable in accordance with the manner in which the players use their respective gaming machines. For example, the system 10 may be configured such that the values of m and n vary in proportion to the monetary amount bet by each player on each game played.

As further alternatives, the values of m and n can be based on the monetary value bet in relation to each of the available paylines of the respective gaming machine. In this case, the value of m and n may be determined by taking an average of the respective amount bet on the various available paylines. Alternatively it may be related to the amount bet on a particular payline where only a win of that payline will cause the jackpot to be won.

As yet a further alternative, the values of m and n can be based on the number of available paylines on which a player elects to bet in a particular game.

In yet another embodiment, the system can be configured to enable a player to win a jackpot without the identity of the jackpot being specified. In this embodiment, the player may elect which of the jackpots 1112, 1114, 1116 and 1118 to accept. It is envisaged that the likelihood of winning such a jackpot option (i.e. winning the choice of jackpot) will be according to yet another probability. In this embodiment, to enable the player who wins such a jackpot to make an informed election as to which of the jackpots 1112, 1114, 1116 and 1118 to accept, the player can be provided with means of discerning the value of all available jackpots.

In an alternative embodiment, the player might be prevented from discerning the value of the jackpots associated with the other gaming machines so as to create an additional element of risk to add to the player's playing enjoyment.

In another embodiment of the invention, a player may be eligible to win a portion of a particular one of the jackpots 1112, 1114, 1116 and 1118. In one form of this embodiment, in the event that a player wins such a partial jackpot, the partial jackpot won is a portion of the jackpot associated with that player's gaming machine. In another form of this embodiment, the partial jackpot won is a portion of a jackpot associated with another one of the gaming machines.

In an alternative embodiment, players may be able to win or "steal" jackpot values from another machine. In this case the win does not result in the monetary value of the jackpot being paid to that player, rather the win will result in the jackpot amount to the player's jackpot being increased by the "stolen" jackpot value.

It will be appreciated that, although the player will not actually have won the "stolen" jackpot in the sense of being directly rewarded with a payment, the player will have significantly increased the value of the jackpot associated with that player's gaming machine.

Although the embodiments described in relation to FIG. 11 have one jackpot 1112, 1114, 1116 or 1118 associated with each gaming machine 1104, 1106, 1108 or 1110, in other embodiments (not shown), each jackpot may be associated with more than one gaming machine as in the example of FIG. 8.

Figure 12:
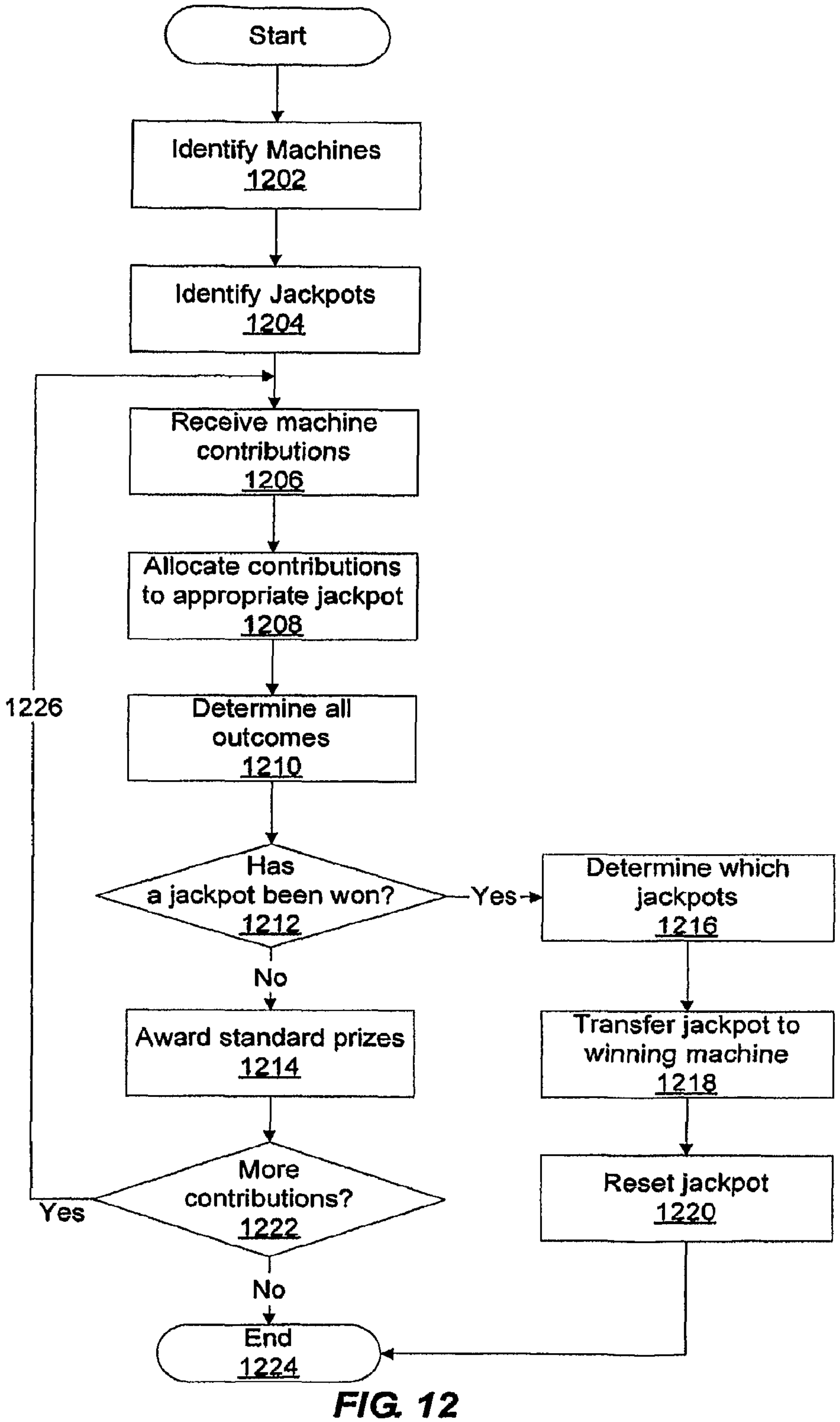
FIG. 12 depicts a flowchart showing a game process incorporating a jackpot process that may be implemented on the system of in FIG. 11 in an embodiment of the present invention.

FIG. 12 shows a flow diagram illustrating a process performed by the system 1110 of FIG. 11.

The first stage 1202 in the process 1200, the system 1110 identifies all of the gaming machines forming part of the system 10.

The system 1110 then in step 1204 identifies the jackpots, e.g. as the jackpots 1112, 1114, 1116 and 1118, which are connected to the system 1110, and defines the desired relationships between the gaming machines 1104 to 1100 and the jackpots 1112 to 1118.

Play begins on each machine by the players placing bets by inserting coins or bank notes or other payment means such as bank or credit cards into the gaming machines. A portion of each is then allocated to a jackpot contribution for the player. The step of receiving these monetary contributions is represented by the block 1206.

Once the monetary contributions have been received, they are allocated to the appropriate associated jackpots as represented by the block 1208.

In step 1210, the game outcomes are determined by the game outcome server 1102. If in step 1212 no gaming machine has won one of the jackpots 1112 to 1118 the process 1200 proceeds by awarding any normal game-related prizes in step 1214 (that is, a non-jackpot prize).

If, however, any of the gaming machines 1104 to 1110 achieves an outcome which results in a jackpot winning event, then the game outcome server 1102 determines which of the jackpots 1112 to 1118 has been won, in block 1216. In the embodiment described above in which a player is provided with a choice as to which of the jackpots to accept, the player's choice is made before the step represented by block 126 in which case the determination represented by block 1216 is made in accordance with the player's choice.

The determined jackpot 1112 to 1118 is then allocated to the relevant gaming machines 1104 to 1110, either by way of an actual cash payout or by allocating a certain credit value to the player in step 1218. Next in step 1220 the jackpot which was won is reset to its nominal amount or zero as the case may be. Alternatively, in the embodiment described above, in which a player may "win" or "steal" another jackpot the payout is effected by adding the value of the other jackpot (being a jackpot not normally associated with the particular player's gaming machine) to the jackpot associated with the player's gaming machine.

At this stage, the system determines in step 1222 whether game play is continuing, by determining whether any more monetary contributions have been made. If none have, then the process 1200 ends 1224. On the other hand, if play is continuing the process 1200 returns to the position 1226, so that the process 1200 may once again continue from this stage.

Implementing a jackpot system in which a cascade of jackpots can be won is also possible using an embodiment of the present invention. In this embodiment, if the criteria for winning a first predetermined jackpot have been satisfied on a particular gaming machine, the criteria to become eligible to win successive jackpots is not based on future game outcomes but based on the fact that the earlier jackpot has been won. The process of being rendered eligible for winning a further jackpot by virtue of winning a previous jackpot can continue until all of the available jackpots have been won or until some other predetermined terminating condition is met. Such terminating conditions may render a particular gaming machine ineligible to win a subsequent jackpot or particular ones of a plurality of jackpots available despite having won a previous jackpot. Thus the terminating events are effectively eligibility negating events.

One eligibility negating event might be that the player has won all of the jackpots available, a further terminating condition might be that the last jackpot won in the cascade sequence had a monetary value less than an earlier jackpot in the same sequence, or conversely that the most recent jackpot won has a higher monetary value than an earlier jackpot won.

The system can also be configured so that the cascade sequence will terminate when the player wins the jackpot associated with their particular gaming machine. In this regard, the cascade sequence may allow non-associated jackpots to be won even if the gaming machine has not made any monetary contributions towards it, but as soon as the player's own jackpot is won, the cascade sequence is terminated. As will be appreciated by those skilled in the art the opposite can also be implemented in which the player wins each of the jackpots which his or her machine has contributed too, but once a jackpot which is not associated with the machine is won the cascade sequence may stop. As described in an earlier embodiment jackpot interaction in embodiments of the present invention need not involve merely making contributions to a jackpot and winning a jackpot but can be defined in a wide variety of ways in embodiments of the present invention.

In a variation of the embodiment of FIG. 7, rather than a system processes interacting with a jackpot process to make the jackpot switch from game to game, additional game-jackpot interactions can be defined, which cause the jackpot interactions to change. For example, certain game outcomes e.g. particular winning combinations on a real-type game may cause the jackpot eligibility to move from one gaming machine to another. For example, if a gaming machine which does not have the jackpot associated with it has a particular winning outcome the jackpot may be caused to move such that it is associated with that gaming machine. Conversely, if a gaming machine which has a jackpot associated with it has a particular loosing outcome the jackpot may be configured to move away from it to another gaming machine. Alternatively, the change of jackpot eligibility may be based simply on the passage of time. In this case, after a predetermined amount of time elapses without the jackpot being won the system may cause it to move to the next gaming machine. As will be appreciated since gaming machine only has a limited time frame in which a particular jackpot can be won it may be desirable to increase the probability that a jackpot winning event will occur on the gaming machine during that time period. For example, on a system configured such that the gaming machine is always eligible to win a particular jackpot, the jackpot winning event might be the occurrence of five scatter symbols on a spinning reel game, whereas if a jackpot is only able to be won on a gaming machine for a predetermined period of time, the necessary winning combination may be reduced to only four scatter symbols. In this example, the trigger for moving the jackpot to another gaming machine might be the occurrence of a "near miss" on the gaming machine which is currently eligible to win the jackpot. In this regard, it may be determined that an outcome in which three scatter symbols are visible in a spinning reel game meets the predetermined jackpot interaction criteria that causes the jackpot to move to another gaming machine.

Embodiments of the present invention also enable jackpots to be awarded in a "team gaming" environment in which players on two or more groups of gaming machines compete with each other in order to win jackpot prizes.

Figure 13:
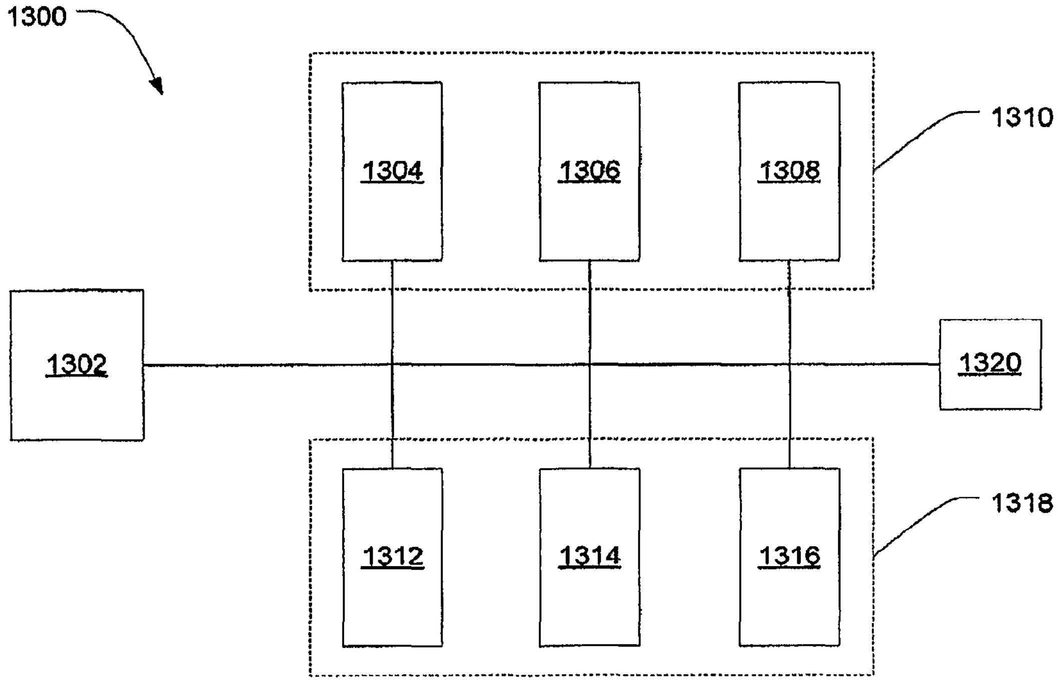
FIG. 13 depicts a schematic diagram of yet another gaming system operating in accordance with an embodiment of the present invention.

FIG. 13 shows that gaming system 1300 which comprises a game outcome server 1302 which is coupled to a plurality of gaming machines 1304, 1306, 1308, 1312, 1314, 1316 and a jackpot display 1320. The gaming machines 1304, 1306, and 1308 constitute a first team 1310 and gaming machines 1312, 1314, 1316 constitute a second team 1318. In the present embodiment only one gaming machine at a time is being provided with a jackpot service, i.e. is eligible to win jackpot 1320. However, when jackpot 1320 is won the jackpot prize is shared between members of the winning machine team e.g. 1310 and 1318. In this embodiment, certain jackpot interaction can be defined which cause the jackpot to move from one gaming machine to another. As will be appreciated from the foregoing, in order to move the jackpot the inter-service interactions between the jackpot service and the game services of at least to gaming machines need to be modified. In this regard, if any of the machines achieves a particular winning outcome this may trigger the jackpot to move to another gaming machine, and if a second predetermined winning outcome is achieved on the gaming machine with which the jackpot is associated then the jackpot will be won.

In one implementation, if a gaming machine other than the one which is currently eligible to win the jackpot achieves the first predetermined outcome the jackpot is forced to become associated with that machine. If on the other hand, the gaming machine which currently has a jackpot associated with it achieves the first predetermined outcome the player of that machine can choose which of the other machines the jackpot is transferred to. As the machines 1304 to 1316 are set up in teams 1310 and 1318 this typically involves the player selecting a gaming machine on his or her team. Alternatively, if the first and second winning combinations of are the same and the gaming machine which currently has the jackpot associated with it achieves the predetermined outcome then the jackpot will be paid out to that machine for division amongst the members of its team.

As mentioned in previous example a "losing combination" may cause a jackpot interaction which forces the jackpot to move to another gaming machine. In this regard, the system 1300 can be set up such that if any of the gaming machines which are in the same team as the gaming machine which currently has the jackpot associate with it achieves the predetermined losing outcome, the jackpot can be caused to move to another gaming machine. In this embodiment, the jackpot may be forced to move to a machine belonging to the other team. It is also possible to give the player of the gaming machine who is loosing the jackpot to choose which gaming machine gets the jackpot.

Alternatively other factors may serve as the trigger event for jackpot interaction which causes the jackpot to move from one machine to another, such as the playing patterns of the players of the gaming machines 1304 to 1316. For example, the bet rate of a particular player, which may be defined as the average number of bets in a predetermined time period can be used to determine which machine has the jackpot associated with it after a predetermined trigger condition occurs. For example, if a predetermined jackpot interaction occurs which makes the jackpot move to another machine a range of factors may be taken into account to determine which machine receives the eligibility to win the jackpot. Of course this may be done in a random fashion, however, in order to increase player interest, the player themselves may be allowed to have some influence of the allocation of the jackpot eligibility. In this regard, a player's average bet or average bet per payline or bet rate can be used to determine which gaming machine has a jackpot associated with it.

In a first embodiment, in which the jackpot is associated with gaming machine 1304, if a predetermined triggering event occurs, which forces the jackpot to move to another machine, the system process can determine which gaming machine receives the jackpot eligibility next. In this regard, as the gaming machines 1304 to 1316 are arranged in two teams 1310 to 1318, the system process can be configured to give priority in allocation of the jackpot to a member of the same team, i.e. team 1310.

Alternatively the system process may give priority to a gaming machine of the other team 1318. In the present embodiment it is possible for the players of the gaming machines of team 1318 to adjust their priority level and thus increase their chances of having the jackpot assigned to their team. In this regard, if the gaming machines 1312 to 1316 belonging to team 1318 have a high enough bet rate they are given priority the next time the jackpot is to be assigned, notwithstanding that priority would otherwise be given to a member of team 1310.

Clearly time may also be used as a trigger for determining when, and to which gaming machine the jackpot 1320 will be transferred. In this regard, after some predetermined time the jackpot may be triggered to move to another gaming machine e.g. if the jackpot 1320 has been associated with a gaming machine belonging to one of the teams 1310, 1318 for greater than a total predetermined continuous time then the jackpot may be forced to move to a gaming machine belonging to the other team.

In a case as described above, where it is the relative betting patterns of the respective players that causes the status of the jackpot 1320 to move between machines, it is necessary that the system 1300 be adapted to keep a record of the monetary contributions made, and bets placed, including the types of bets and strategies selected by each of the players on each of the gaming machines 1304 to 1316. The system 1300 must be adapted to keep track of such statistics not only for a particular period of game-playing time (e.g. one hour), but for extended periods as well.

Thus, the system 1300, include a player identification means to track player usage of the game system 1300 to ensure fair access to the jackpot 1320.

As can be seen from the foregoing embodiments of the present invention can be configured to allow game processes and players to interact with jackpot processes in a wide variety of ways (including triggering the win a jackpot) that are not possible with standard jackpot configurations. The ability to dynamically define the interaction criteria and the nature of the interaction also allow jackpot processes to interact and influence game play in a manner not previously possible.

While the foregoing description has been provided by way of example of the preferred embodiments of the present invention as presently contemplated, which utilise gaming apparatus and machines, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A gaming system comprising:

a plurality of gaming machines; and a system control resource in data communication with the plurality of gaming machines, wherein the system control resource is configured to control the provision of a first service for execution of a game on each of the plurality of gaming machines, wherein the first service for each of the plurality of gaming machines is executable concurrently with and independently of a jackpot service, and wherein inter-process communication is spawned between the first service for a given machine and the jackpot service in response to system parameter data to thereby allow jackpot play on the given game; and wherein the system control resource is configured to provide a second service to components of the gaming system, wherein the second service is a service comprising:

a system process, configured to control operation of at least part of the gaming system;

a player process, representative of a particular player participating in a game controlled by the gaming system; and a terminal process, representative of the operation at least an aspect of a gaming machine that is a part of the gaming system.

2. The gaming system of claim 1, wherein the game process and jackpot process are combined on the given machine as a terminal process which is executed by the given gaming machine.

3. The gaming system of claim 1, wherein the system parameter data is provided by a system process executed on a system server.

4. The gaming system of claim 1, wherein the system parameter data includes data corresponding to a dynamic event.

5. The gaming system of claim 1, wherein the system is configured to allow dynamic configuration of the system parameter data.

6. The gaming system of claim 1, wherein the system control resource is configured to move a service running on a server to one of the plurality of gaming machines.

7. The gaming system of claim 1, wherein the system control resource is implemented by one or more system processes running on a server system.

8. The gaming system of claim 1, wherein the inter-process communication is spawned between the first service for a given machine and the jackpot service when a predetermined event takes place in the jackpot process or the game process.

9. The gaming system of claim 1, wherein a data processing resource of a gaming machine is selectively used as a remote data processing resource of the server control resource.

* * * * *